United States Patent [19]

Dolby

[11] Patent Number: 4,712,208
[45] Date of Patent: Dec. 8, 1987

[54] DISC REPRODUCING SYSTEM FOR COMPENSATING MECHANICAL IMPERFECTIONS

[76] Inventor: Ray M. Dolby, 50 Walnut St., San Francisco, Calif. 94118

[21] Appl. No.: 230,423

[22] Filed: Feb. 2, 1981

Related U.S. Application Data

[63] Continuation-in-part of Ser. No. 5,992, Jan. 24, 1979, abandoned, which is a continuation-in-part of Ser. No. 859,799, Dec. 12, 1977, abandoned, and a continuation-in-part of Ser. No. 965,423, Dec. 1, 1978, abandoned.

[51] Int. Cl.[4] .............................................. G11B 3/04
[52] U.S. Cl. ..................................... 369/128; 369/60; 369/140
[58] Field of Search ............... 369/128, 140, 141, 135, 369/136, 60, 48, 88, 95; 381/13, 71, 94; 455/304, 305

[56] References Cited

U.S. PATENT DOCUMENTS

| | | | |
|---|---|---|---|
| 2,258,596 | 10/1941 | Cortello | 369/140 |
| 2,759,049 | 8/1956 | Scott | 369/60 |
| 2,775,460 | 12/1956 | Shivack | 369/136 |
| 2,948,783 | 8/1960 | Scully | 369/132 |
| 3,120,393 | 2/1964 | Pennucci | 369/140 |
| 3,830,505 | 8/1974 | Robinow | 369/43 |
| 3,876,943 | 4/1975 | Watt | 455/305 |

FOREIGN PATENT DOCUMENTS

| | | | |
|---|---|---|---|
| 2148972 | 3/1973 | France | 369/132 |
| 2212599 | 7/1979 | France | 369/43 |
| 2013957 | 8/1979 | United Kingdom | 369/128 |
| 2020880 | 11/1979 | United Kingdom | 369/43 |

*Primary Examiner*—Alan Faber
*Attorney, Agent, or Firm*—Majestic, Gallagher, Parsons & Siebert

[57] ABSTRACT

Apparatus for reducing the effects of vertical perturbations of a phonograph disc surface resulting from disc and/or playback system mechanical imperfections. Such imperfections are compensated by closed loop and/or open loop means wherein the deviations of the record path are detected and employed to minimize the effects of the mechanical imperfections.

30 Claims, 32 Drawing Figures

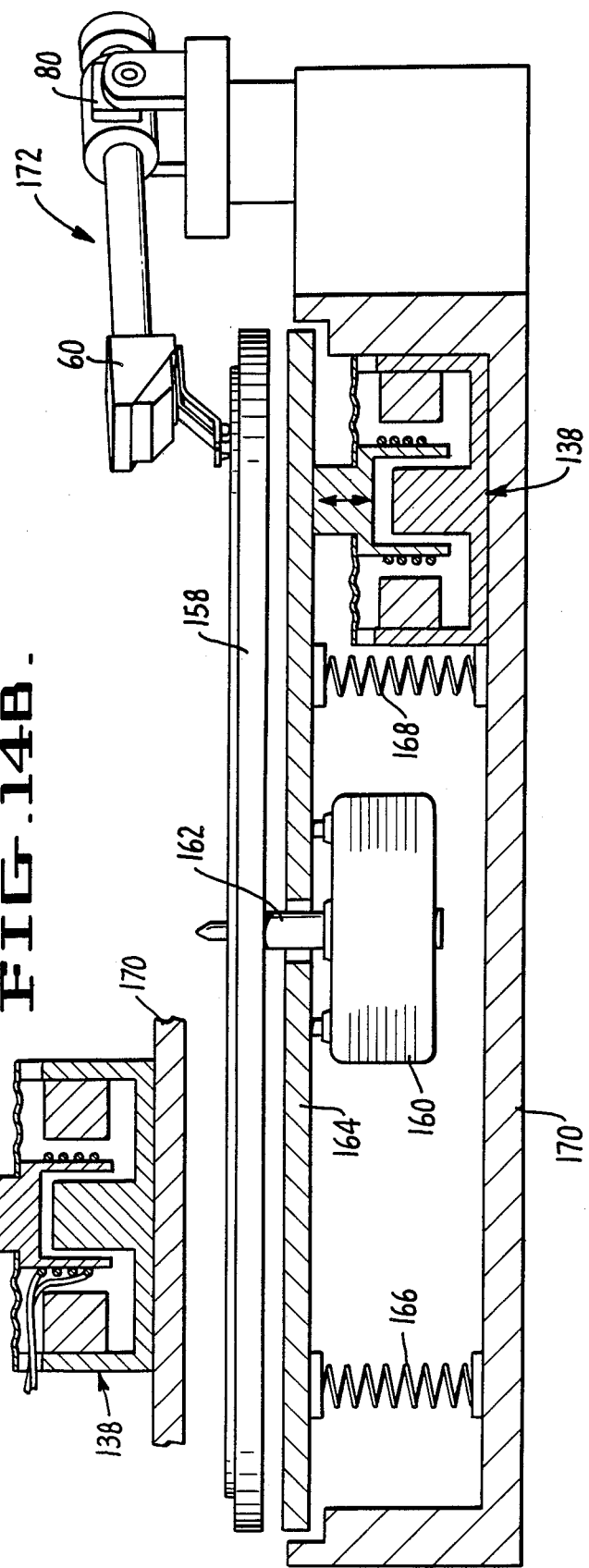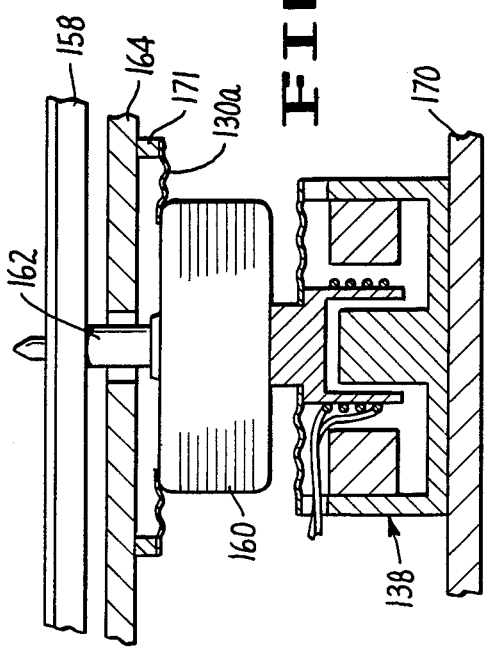

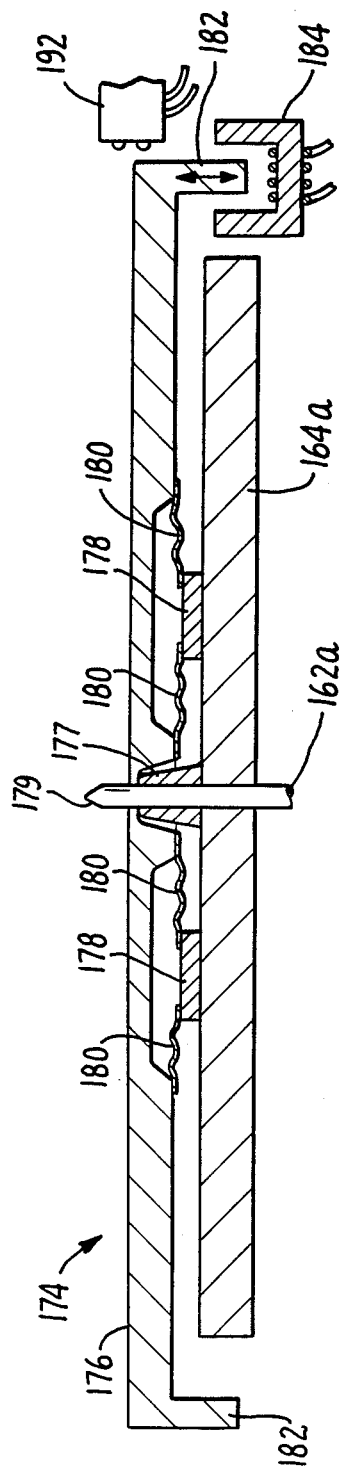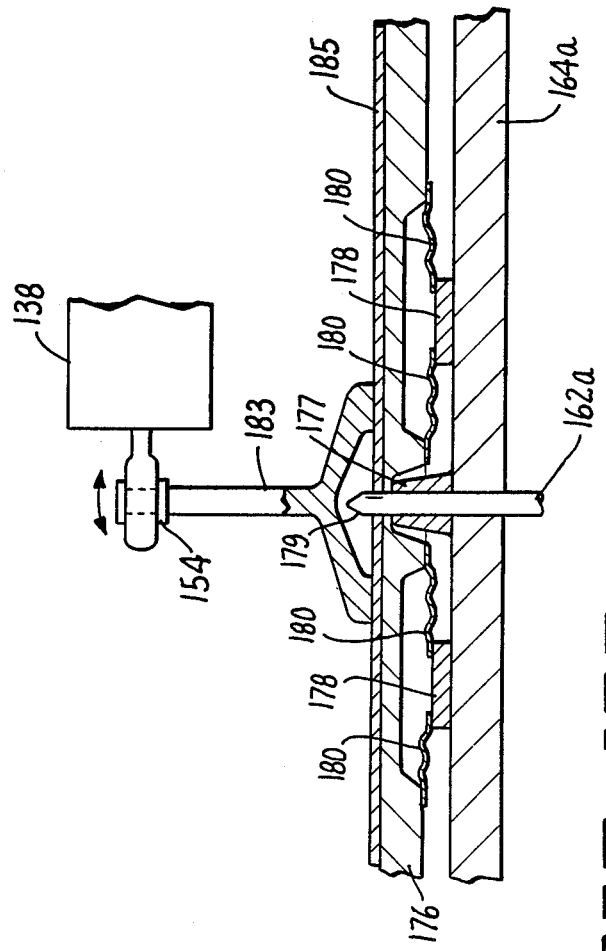

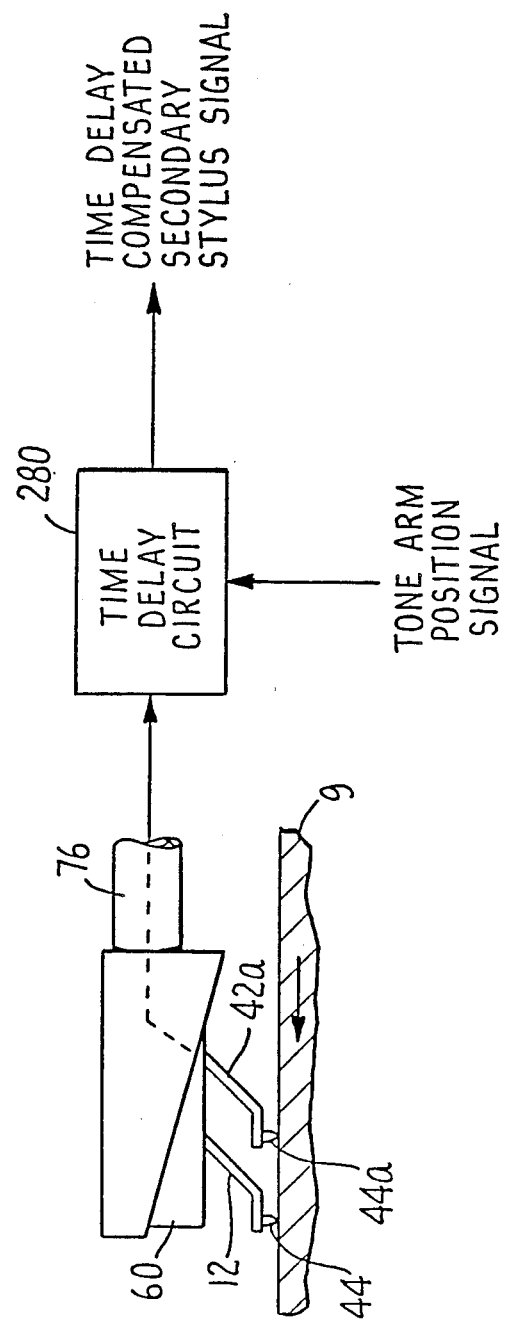

DISC REPRODUCING SYSTEM FOR COMPENSATING MECHANICAL IMPERFECTIONS

This application is a continuation-in-part of my copending application Ser. No. 005,992, filed Jan. 24, 1979, now abandoned, which in turn was a continuation-in-part of my then copending, now abandoned applications Ser. No. 859,799, filed Dec. 12, 1977 and Ser. No. 965,423, filed Dec. 1, 1978.

BACKGROUND OF THE INVENTION

Commercially manufactured disc phonograph records exhibit various mechanical imperfections, and further system imperfections result from the mechanical means employed to reproduce the record. The present invention is concerned with one category of disc reproducing system imperfections: spurious vertical deviations of the record groove, primarily resulting from record warp and rumble, including record pressing noise. Such imperfections can cause significant degradation of the reproduced signal.

WARP

A general discussion of record warp is included in the following published paper: "Record Warps and System Playback Performance," Larry Happ and Frank Karlov, Journal of the Audio Engineering Society, Vol. 24, No. 8, October 1976, pp. 630–638. The authors found warp frequencies in the range of about ½ Hz (the once around frequency at 33⅓ rpm) to beyond 10 Hz, with 95% of the warps below 8 Hz. Peak physical amplitude height of the warps was greatest at low frequencies at about 0.025 in. maximum and decreased with increasing frequency.

Various problems are caused by record warp: the tone arm may bounce or sway with respect to the record surface due to the vertical and, to some extent, lateral, forces which result as the stylus attempts to track the varying record height. This may cause not only variations in tracking force but bottoming of the cartridge or complete loss of contact between the stylus and groove. Such variations in tracking force from optimum will often affect the reproduced signal at audible frequencies. In addition to causing stylus and arm tracking problems, excessive stylus excursions result in geometrically related distortions and electro-mechanical non-linearity of the cartridge. Moreover, subaudible warp signals can cause distortion by amplifier overload in electronic systems passing such low frequencies and, if applied to the spearker system, can cause substantial woofer movement that can result in extraneous noises and the distortion of higher frequency audible signals, including doppler distortion. Further, the geometrical relationship of the stylus and record groove is such that a warp results in a forward and backward oscillation of the stylus tip over the recorded groove information, which frequency modulates (advances and delays) the reproduced signal causing "wow". Wow may also result from variations in rotational speed as the stylus load on the record groove varies.

The requirement to track warped phonograph records satisfactorily has resulted, in prior art systems, in the necessity to consider tonearm/cartridge/stylus/-record geometry very carefully and to seek the best combination, usually a comprise, of such factors as stylus and tone arm mass, tone arm damping, stylus compliance and damping, and tracking force so as to provide a controlled tone arm resonance above the commonly encountered warp frequencies, yet below the frequency of the lowest recorded groove information. An arm resonance of 10 Hz has been advocated by several designers: Keisuka Ikegami and Susumu Hoshimi, "Advance in Turntable and Tone-Arm Design", *Journal of the Audio Engineering Society*, May 1976, Vol. 24, No. 4, pp. 276–280 and Peter Rother, "The Aspects of Low-Inertia Tone-Arm Design", *Journal of the Audio Engineering Society*, September 1977, Vol. 25, No. 9, pp. 550–559.

Although in principle the proper selection of tone arm and cartridge parameters may make possible the tracking of warped records, the matching of arms and cartridges is often complicated in practice because of the wide variation in tone arms and cartridges available. Further, even at the design stage, the selection of optimum tone arm and cartridge parameters for warp tracking may not be optimum for tracking higher frequency groove information. Even when the record is properly tracked, the problem of geometric and motor wow from warps still remains.

Various passive devices for tracking warped records are knonw. These devices typically employ an element riding the record surface and fixed or coupled to the pickup cartridge or the tone arm in the vicinity of the cartridge. Such devices include both damped elements and undamped or fixed elements. Exemplary prior art damped element devices are disclosed in U.S. Pat. Nos. 2,572,712 to Fisher (spring loaded plunger), and 2,328,862 to Thompson (elastically mounted auxiliary stylus). Fixed elements are disclosed in U.S. Pat. Nos. 3,228,700 to Andrews et al. (felt pad at end of tone arm with cartridge pivoted in tone arm) and 3,830,505 to Rabinow (air bearing adjacent cartridge). It is known also to employ a dash pot of a brush adjacent the cartridge to damp oscillations and assist in tracking warps. Further, proposals for a relatively rigid element coupled in the tone arm to the record surface are known. It has also been suggested that the record be clamped or weighted at its periphery and/or center in order to eliminate warp.

An active prior art system for treating record warp is described in the following paper: "Overcoming Record Warps and Low-Frequency Turntable Rumble in Phonographs", Kenneth Clunis and Michael J. Kelly, *Journal of the Audio Engineering Society*, July/August 1975, Vol. 23, No. 6, pp. 450–458. In this system the cartridge output is used to servo control the vertical tone arm position to assist in tracking the record warp. Similar systems are disclosed in U.S. Pat. Nos. 3,623,734 to Sakamoto et al. and 3,830,505 to Rabinow. It is also known to provide a closed loop around the tonearm movements only, in order to improve arm/cartridge damping. Aspects of the present invention can significantly improve the performance of these prior art tone arm systems.

RUMBLE

Turntable rumble may result from turntable bearings, motor drive systems, and environmental vibrations. Considerable efforts are made by turntable manufacturers to eliminate rumble from these sources.

Other turntable related disturbances are caused by acoustic feedback (sonic and infra-sonic) from the loudspeakers, whereby the turntable and/or record may act as a receptor for the vibrations, resulting in tonal coloration or even howling. Devices for reducing these effects include a fluid filled turntable mat disclosed in U.S. Pat. No. 3,997,174 to Kawashima, and flexible turntable support cups in U.S. Pat. No. 4,054,291 to Maeda, both for providing a conforming damped support under warped records.

Notwithstanding these efforts, the main source of low frequency annoyance is record pressing rumble or mold grain noise from the disc itself. The spectrum of record pressing noise is discussed by John Eargle, "Performance Characteristics of the Commercial Stereo Disc," *Journal of the Audio Engineering Society*, August 1969, vol. 17, No. 4, pp 416–422. Mold grain noise may extend generally to several hundred Hz.

Record pressing rumble and turntable rumble are reduced conventionally by means of high-pass filters in the signal paths or by low frequency channel blending or cross-coupling schemes. Optimum tone arm/cartridge resonance characteristics are also useful in reducing low frequency rumble effects.

SUMMARY OF THE INVENTION

Prior art approaches to dealing with warp are directed primarily to the symptoms of warp. For example, the passive tone arm to record surface contact devices and the closed loop tone arm systems act chiefly as means to enhance the ability of the cartridge and tone arm simply to track warps. Consequently, such approaches may fail to correct other effects of warp and may degrade tracking ability and signal quality at non-warp frequencies. With regard to rumble, prior art techniques have been directed primarily to electrical filtering or channel blending rather than to dealing with the rumble mechanism itself.

It is the object of the present invention to reduce the effects of warp and rumble without in any way degrading the bandwidth, channel separation or other performance characteristics of the signal channels themselves.

The present invention is based on observations taken from the situation shown in FIG. 1a and FIG. 1b. FIG. 1a represents a sectional side view of the top half of a hypothetical record master on which silent grooves have been recorded. The groove depth "a" is a constant and represents the instantaneous vertical signal modulation with respect to a perfect reference path or surface. The reference surface may be the flat lacquer master disc surface, but in accordance with an aspect of the invention, shown in FIG. 2, the reference surface may optionally be defined in the cutting process preferably by a flat secondary cutting stylus following the main cutting stylus and arranged to smooth and dimensionally define the land between the grooves. In some cases, in the frequency range in which there is little vertical information recorded on the disc (e.g. below 30 Hz) the groove itself may be used as the reference path.

FIG. 1b represents the situation after making a record pressing of the master. The vertical groove position is no longer constant but contains irregularities. In the case of warp, these are dimensionally correlated on the two sides of the record (the thickness remains substantially constant), because they arise simply from thermal and handling related distortions during and after removal of the record from the press. Higher frequency mold grain noises, however, are not correlated on the two sides of the record, since different dies and stampers are used; the disc thus contains local variations of thickness. Such imperfections are caused by the pressure transmittal of dimensional irregularities from the back to the front of the stamper during the pressing operation. The back surface irregularities may include metallic crystals arising from the replication process, patterns resulting from grinding operations to smooth the back surface, dirt and dust trapped between the stamper and the die of the record press, and surface irregularities of the die.

As the stamper thickness is some 0.007" to 0.010" the rigidity or stiffness of the material will limit the shortest wavelengths which can be transmitted through localized bending and distortion of the stamper. Thus, such wavelengths might be of the order of 0.020". This results in a highest frequency of mold grain noise at the outer diameter of a twelve inch disc (groove velocity about 20 inches per second) of the order of 1 kHz.

Further sources of low frequency noise on the record itself may include non-homogeneity of the pressing material and geometric distortions due to differential cooling effects resulting from rapid and uneven temperature changes in the die face. Moreover, as discussed previously, noises are also contributed by the reproducing system—namely, turntable and environmental rumble and acoustically transmitted vibrations of the turntable and disc.

Thus, in a conventional reproducing system, the reproduced quantity "b" is obtained, employing the tone arm position as a reference. The quantity "b" thus includes undesired low frequency noise components.

Closer consideration of this matter shows that the low frequency noise components from all the sources mentioned above are not inextricably mixed with the original signal modulations. Rather, the recorded signal quantity "a" remains intact and unharmed by the pressing and reproducing process and by mechanical imperfections in the reproducing system. Thus, the quantity "a" can be recovered if the distorted reference path at the point of stylus contact is used as the reference point during reproduction. Preferably, the reproducer system acts to remove spurious deviations of the reference point so that again the disc surface is in effect flat (i.e., effectively vertically stable) in the vicinity of the stylus. Alternatively, the undulating reference point is used in determining the true signal quantity "a".

Thus, in accordance with the teachings of the present invention, the problems of the prior art are solved by a disc record reproducing system in which mechanical imperfections in the disc or in the system, causing deviations in the tracked disc path, are compensated by means of measuring an appropriate quantity to produce an error signal and by means of utilizing this signal to effect an appropriate correction, mechanically and/or electrically. A sensing means generates a signal responsive to deviations in a reference path at or in close proximity to the pickup or stylus and that signal is processed to control the system in order to minimize the effect on the disc playback signal caused by the deviations.

In the context of the invention, sensing "in close proximity" means within a small fractional part (e.g., less than about one-tenth) of the shortest wavelength which it is desired to correct. If the mold grain noises have wavelengths as short as about 0.020 inches, this implies sensing within about 0.002 inches—i.e., on an immediately adjacent land area. In the simplest form, this would represent the limit of the technology of the invention, although with time delay schemes the physical proximity requirements can be relaxed and the time delay adjusted to effectively provide sensing in close proximity by bringing the signals in substantial time coincidence. For lower frequency noise and warp it is, of course, unnecessary to sense in such close proximity.

There are four main embodiments of the invention, which for convenience may be referred to as a Vertical Noise Compensator (VNC). The embodiments may be used separately or in combination.

In all embodiments, the vertical position of an unmodulated portion of the record is effectively sensed at or in close proximity to the stylus. The information so derived may be referrred to as reference path information. In some embodiments, the reference path information is sensed with respect to the arm or cartridge position; such information may be referred to as reference path-arm information. Reference path information or reference path-arm information is preferably obtained via sensing means arranged to sense the land position adjacent the signal groove and in close proximity to the signal stylus. It is important that the vertical sensor responds substantially only to vertical information; in disc recording technology the term "vertical" conventionally has the meaning of perpendicular to the disc surface, or in an axial direction. A less desirable alternative, for the treatment of warp and very low frequency rumble effects only, is to sense the groove depth itself.

In the first embodiment, reference path information is obtained and used in a closed loop servo system including an actuator which moves the disc substantially vertically, a least in the vicinity of the pickup stylus. Ideally, the result is that at least all vertical disc movement in the vicinity of the pickup stylus is removed, thereby allowing the stylus effectively to track a warp-free and rumble-free record. This embodiment may be referred to as a disc VNC (or a turntable VNC, inasmuch as vertical actuation of the disc is most readily accomplished via mechanisms associated with the turntable).

A second embodiment, which may be called a tone arm VNC, is an improvement of the closed loop tone arm techniques of the prior art. In prior art systems, the error signals used include arm-cartridge resonance components or other misleading information. In the present invention, measurements avoiding these defects are made and processed to control the tone arm; namely, reference path information is obtained and employed to control the tone arm and optionally to perform additional corrections via the other embodiments. Low frequency components can be employed in a turntable VNC for warp compensation and higher frequency components can be used in a cartridge VNC or pre-amp VNC for rumble and mold grain noise reduction.

In a third embodiment, which may be referred to as a cartridge VNC, reference path-arm information is obtained and used to effect correction within or following the cartridge. The reference path-arm information is cancelled either electrically or mechanically from the information provided by the signal stylus. The reference path-arm information may optionally be brought out of the cartridge in order to perform additional corrections via the other embodiments.

In a fourth embodiment, which may be called a pre-amp VNC, the reference path-arm information is obtained and cancelled from the audio output electronically in the preamplifier. This arrangement can be used to reduce mold grain noise, rumble and some of the effects of warp.

For optimum mechanical and acoustical performance, it is preferable to combine the turntable VNC or tone arm VNC methods with the cartridge VNC and-/or the pre-amp VNC methods. For example, warp and rumble effects may be compensated up to, say, 20 Hz using a turntable VNC or a tone arm VNC, with frequencies above this being treated by a cartridge VNC or pre-amp VNC.

Compatibility characterizes all the embodiments of the invention. Conventional records may be played on reproducer including the invention; conversely, records produced with the optional defined reference surface of the invention may be played on conventional reproducers.

The reduction of noise and tracking problems effected by the invention may permit a lower modulation level and a higher groove density to be employed, leading to longer playing times and/or smaller record diameters.

The fact that the invention solves the problem of low frequency noise leads to the further possibility that higher frequency components of the signal may be recorded on the disc in electronic noise reduction encoded form, such as by the system known as "Dolby B". This system, which treats only those signals above about 1 kHz, produces a compressed signal which has a proven history of being sufficiently compatible to permit the single inventory manufacturing and distribution of cassette tapes. Such acceptance in the case of encoded discs would be much more difficult, if not impossible, to achieve on a commercial basis if it were necessary to treat the low frequency signals as well. The encoded discs would, of course, preferably be played back using a noise reduction decoder for reduction of high frequency record pressing noise and low level ticks and pops.

Thus the present invention can make a significant overall contribution to the current performance and future possibilities of the conventional analogue disc record system.

These and other features of the present invention will be appreciated as the following detailed description is read in connection with the drawings.

BRIEF DESCRIPTION OF THE DRAWINGS

FIG. 14A is a partly cross sectional side view of a turntable employing a vertical actuator.

FIG. 14B is a cut away partly cross sectional side view of a further turntable employing a vertical actuator.

FIG. 15A is a cross sectional side veiw of a retrofit type vertical actuator for use with a conventional turntable.

FIG. 15B is a partly cross sectional side view of a further type of retrofit vertical actuator for use with a conventional turntable.

FIG. 25 is a partially block schematic view of a further embodiment of the invention employing a cartridge having a spaced apart secondary stylus.

DESCRIPTION OF THE EMBODIMENTS

In all of the embodiments to be described, only the essential inventive features will be shown or discussed in detail Thus, except where otherwise specified, amplifiers, attenutators, equalizers, differentiators, integrators, feedback loop compensators, gain controls and the like are used as ordinarily required in electronic technology. Likewise, except as otherwise discussed the detailed design of styli, sensor transducers, actuator transducers, and the mechanical and electro-mechanical aspects of disc, cartridges, tone arms, drive motors, and the like will not be treated.

REFERENCE PATH

In the several embodiments, the vertical position of an unmodulated portion of the record (reference path) is effectively sensed at or in close proximity to the signal pickup means, typically a stylus. An important element of the invention is the recognition that close proximity, high resolution sensing is useful for reducing mold grain noise. It follows however, that it is necessary for the reference path to be as unblemished as possible. For example, it should be free of scratches. Moreover, the groove "horns" or ridges of material at the groove edges projecting into the land area should preferably be removed during the disc manufacturing process.

Figure 2:
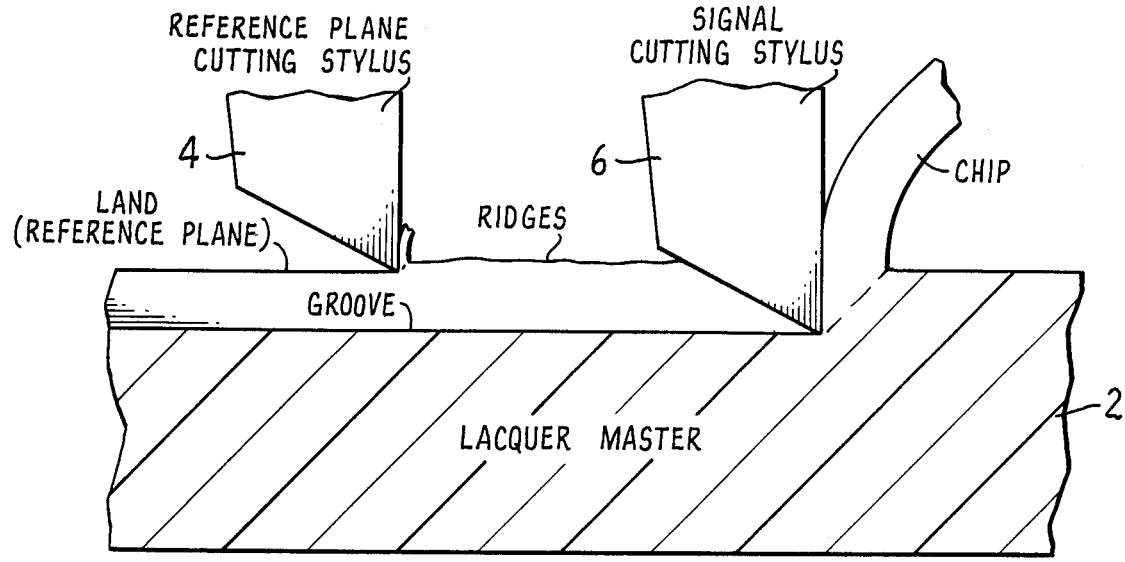
FIG. 2 is a partly sectional side view of a master disc during the cutting process, using a conventional signal cutting stylus and a secondary reference plane cutting stylus in accordance with one aspect of the present invention.

Polishing of the metal mold is a known method for removing groove horns. Another method is shown in FIG. 2, which shows a further reference path cutting stylus 4 following the groove cutting stylus 6. The substantially flat bottom edge of the reference path stylus not only removes the groove horns but cuts away residual rumble modulations on the lacquer master 2 and compensates for any vertical rumble introduced by the recording lathe. A perfectly quiet reference surface is thereby defined for use with the reproducing embodiments of the invention. In one embodiment, (FIG. 6), a pilot groove provides the reference path. In this case, the reference path cutting stylus cuts an unmodulated groove adjacent the signal groove.

REFERENCE PATH INFORMATION SENSING BY DIRECT MEANS

Figure 3A:
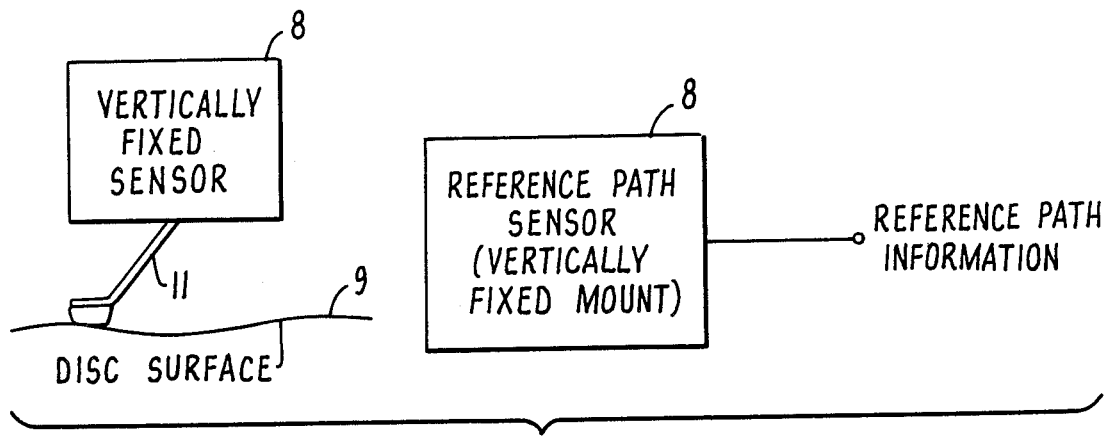
FIG. 3A is a partially block generalized representation of direct reference path information sensing in accordance with one aspect of the present invention.
Figure 3B:
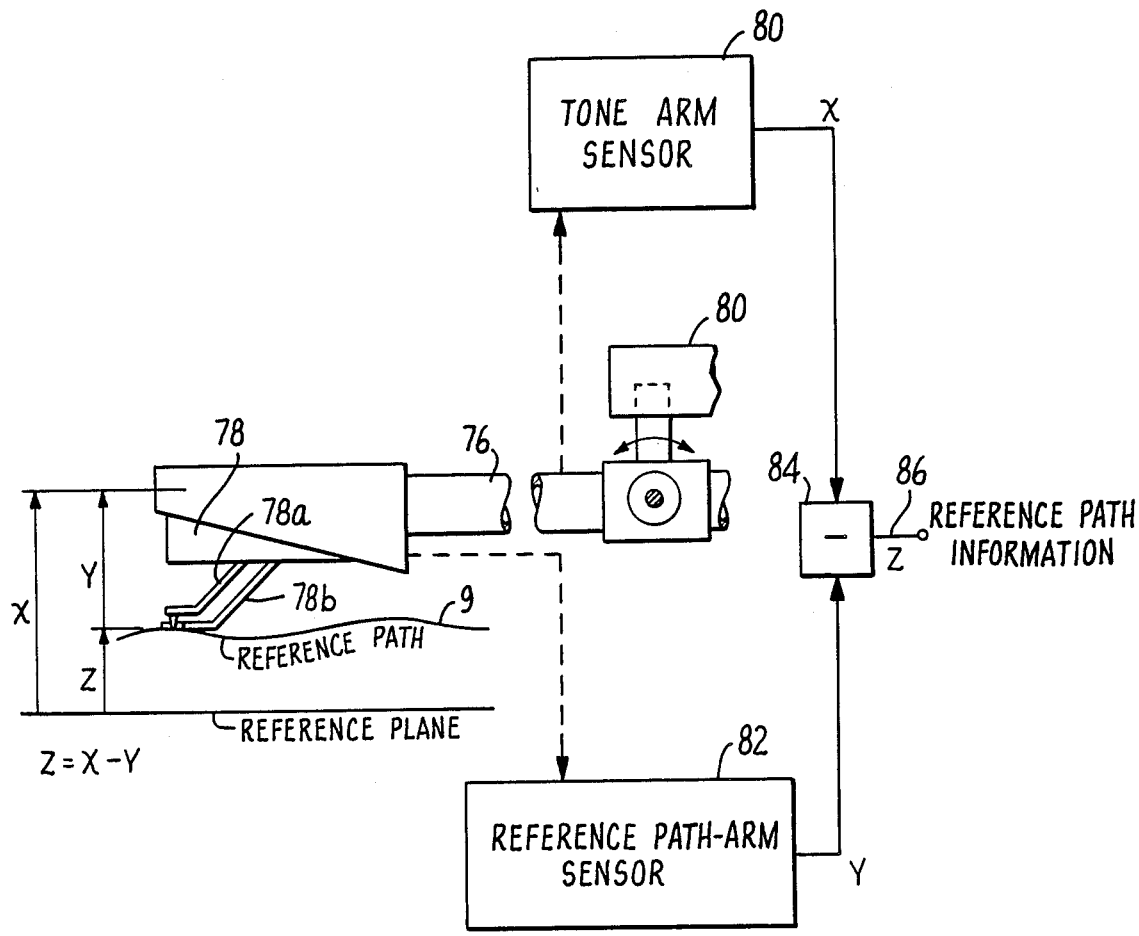
FIG. 3B is a partially block generalized representation of indirect reference path information sensing in accordance with a further aspect of the present invention.

Reference path information sensing (i.e. sensing of the distorted undulating reference path) is a key element of the various embodiments. A generalized representation of reference path sensing is shown in FIGS. 3A and 3B. FIG. 3B is described below under the heading "Reference Path Sensing by Indirect Means." Referring to FIG. 3A, the reference path information can be obtained directly, by means of a sensor which follows the signal stylus laterally but is vertically independent. Sensor 8 is attached to a reference plane. In a conventional turntable the attachment will typically be to the tone arm mounting surface. In theory, the attaching surface can be any suitable reference surface, including a stable surface apart from the turntable itself. A movable member 11, forming a portion of sensor 8, follows the surface undulations of the disc surface. In practice both disc contacting and non-contacting sensors are usable, as described below in connection with FIGS. 4A and 4B.

Figure 4A:
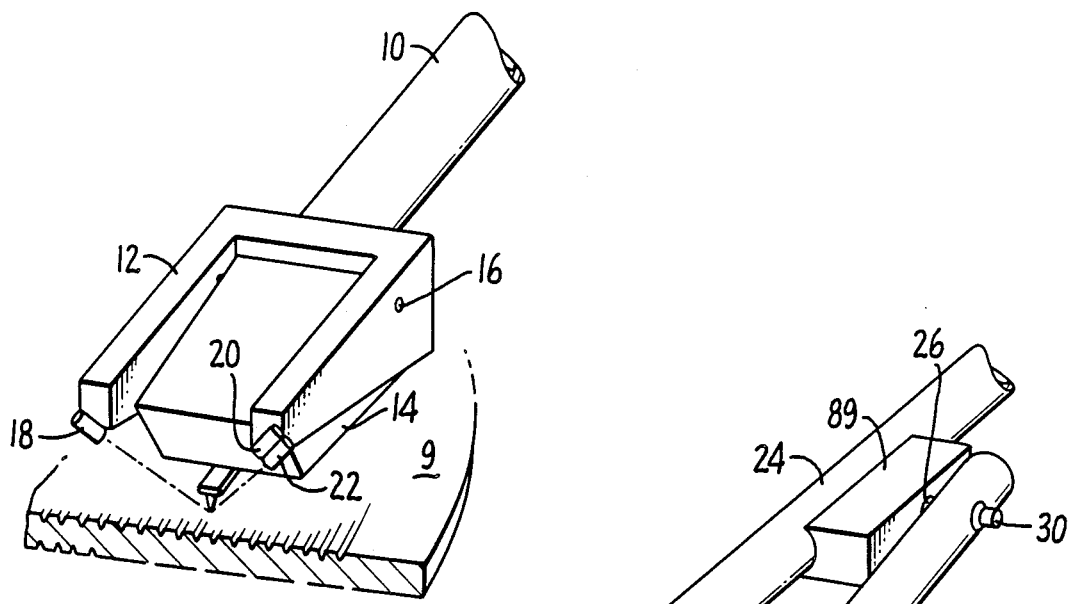
FIG. 4A is a partially cut away perspective view of one type of direct reference path information sensing.

In the version shown in FIG. 4A, the sensor section of the arm may be vertically fixed and the vertical displacement sensing transducer may comprise nonmechanical means to sense the disc surface 9, such as by ultrasonic or capacitive means or by a light beam and detector (e.g. light emitting diode and photodiode). A light beam focused preferably at the point of contact of the stylus, but with a beam diameter encompassing at least one land area, may be angularly directed at the surface; vertical variations are then manifested as lateral variations, which are sensed by one or more photodetectors. This technique has the advantage of providing a relatively wideband error signal without any attendant mechanical resonances. Warp, rumble and mold grain noises at least up to several hundred Hz can thereby be compensated.

In the example of FIG. 4A, the tone arm 10, which is vertically fixed, but free to move laterally, has a U-shaped end 12 in which a cartridge 14 is pivoted on crosswise pin 16. A light source 18 and detectors 20, 22 arrangement similar to that of the sensor version of FIG. 5, described hereinafter, generate the sensor signal.

In the simplest mechanical sensing embodiments the reference path stylus is situated on the cartridge in the manner of FIGS. 6–9 and 25, hereinafter described. In this case the stylus is relatively stiffly coupled to the cartridge body and tone arm, which results in a relatively high vertical resonant frequency of the tone arm. The stylus may be used along for rumble and mold grain noise reduction. It may also be used with a tone arm vertical position sensor to provide reference path information in a turntable VNC or a tone arm VNC.

Figure 4B:
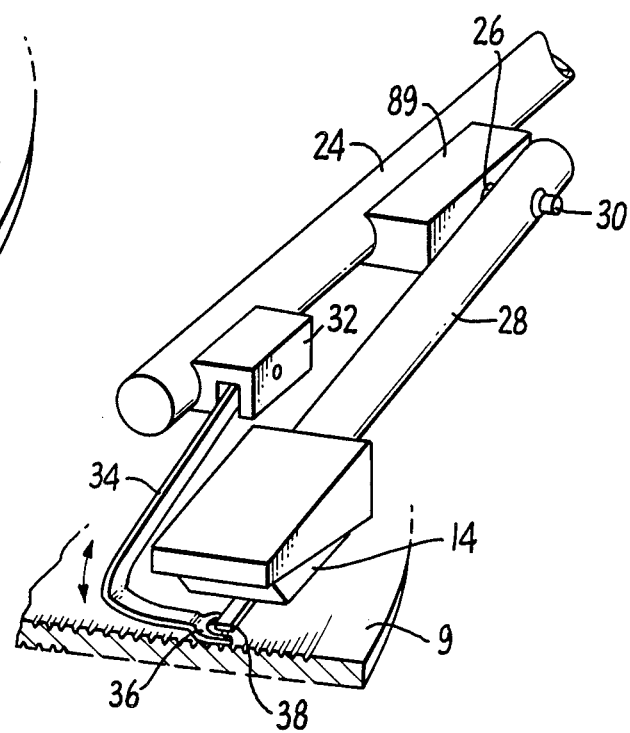
FIG. 4B is a partially cut away perspective view of a further type of direct reference path information sensing.

A further mechanical version of reference path sensing, shown in FIG. 4B, employs a separate stylus laterally coupled to, but vertically independent of, the signal pickup cartridge. An arm 24, which can be pivoted for lateral (horizontal) movement only, has a first lateral support member 26 on which a tone arm section 28 carrying cartridge 14 is pivoted at 30. A second lateral support member and pivot enclosed within a housing 32 has a shank 34 carrying secondary stylus 36. A transducer at the pivot within housing 32 functions as a sensor of the secondary stylus 38 vertical movement. The secondary stylus is arranged to lift from the record whenever the signal stylus is lifted. Preferably, the stylus 36 is dimensioned to contact the land areas adjacent the signal stylus 38 of cartridge 14.

Secondary styli may be constructed of any of various long wearing materials compatible with disc surfaces and resistant to grooving effects, such as sapphire or diamond. Sensor transducers may be any of various types known in the art, including, but not limited to: electromagnetic, photoelectric, Hall effect, magnetodiode, potentiometric, or variable resistance, capacitance or inductance. The untreated output of the transducer may represent position, velocity, acceleration, or force (as with a pressure responding transducer).

The mechanical characteristics of the reference path sensor assembly can be optimized for the vertical sensing function only. The frequency of vertical resonance (sensor flexing and mass) should be placed substantially above the highest warp frequency, and indeed well into the audio band, in order to extend the highest frequency of correction upwards, thereby to reduce audible rumble and mold grain noise. Unless and external signal delay is employed, the secondary stylus must be situated very close to the primary stylus—e.g. within 1 mm for correction to about 50 Hz. Even closer spacing of about 0.1 mm for correction to about 500 Hz is preferable for reduction of mid-range mold grain noise.

The secondary stylus or sensor means may be positioned slightly in advance of the primary (signal) stylus to generate an anticipatory error signal. This is useful for relaxing the gain and phase requirements of electro-mechanical servo loops or for ensuring optimal error cancellation where mechanical or electrical phase shifts are present, as for example with low pass filtering of the reference path information.

The mechanical design requirements of the cartridge can be relaxed by spacing the secondary stylus or sensor means farther from the primary stylus than stated above. In order to bring the primary and secondary stylus signals into coincidence, a delay means is employed as described in further detail below. For optimum correction the delay is preferably varied to account for the varying stylus velocity from the outside to the inside of the phonograph disc. In a low cost design, a fixed compromise delay may be employed.

REFERENCE PATH-ARM INFORMATION SENSING

Other embodiments of the invention employ reference path-arm information; this is the signal obtained by sensing the distance between the reference path and arm (i.e. cartridge). This signal will necessarily include tone arm movements and arm/cartridge resonance effects. A first sensor version simply employs the vertical component information from the pickup cartridge, as is known in the prior art. This method provides useful information above the frequency of arm/cartridge resonance, but is limited to cases and to the frequency range in which channel separation is deliberately reduced during disc cutting (e.g. below 100 Hz).

Figure 5:
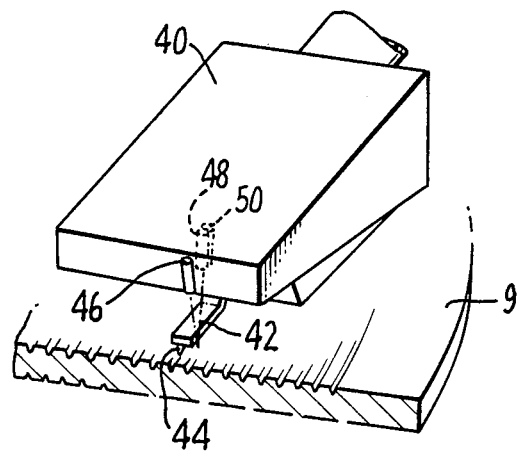
FIG. 5 is a partially cut away side view of one type of reference path-arm sensing.

In order to obtain reference path-arm information up to higher frequencies it is necessary to provide a land sensor which is independent of the signal stylus. Non-mechanical sensing means such as those mentioned previously in connection with FIG. 4A may be used, however being fixed to the cartridge holding arm or cartridge rather than to a vertically fixed arm. An example of such a sensor is shown in FIG. 5. A stereophonic pickup cartridge 40 has a conventional cantilevered shank 42 and stylus tip 44 shown in engagement with a phonograph disc 9. A light source 46, such as a light emitting diode (LED) or diode laser, for example, generates a beam of light to cause an area of the record in the order of a millimeters in diameter, or smaller, to be illuminated. The reflected light is received at one or more photo receptors 48 and 50, such as photo diodes, in the same manner as that of the description of FIG. 4A. The light illumination location and diameter are preferably chosen to illuminate the area in which the stylus tip 44 is located and the adjacent land areas so that the reflected light is responsive primarily to local variations in the land at or just preceding the stylus, which variations are representative of the rumble and mold grain noise at that point. The output of receptors 48 and 50 may be fed to a differential amplifier to provide an indication of local land variations; a suitable circuit arrangement may be made responsive only to vertical land position variations and not to the total light reflected, which will depend upon groove modulations. Such techniques are used in automatic slide focusing mechansims, for example.

Examples of mechanical versions of reference path-arm sensors are shown in FIGS. 6–9 and 25. In each of the embodiments, a dual stylus pickup cartridge is provided in which a conventional stylus tracks the groove information content and the secondary stylus senses warp and rumble information. In the cartridge VNC embodiment of the invention, such a dual contact combination has the potential of improving both warp and rumble performance within a unitary, self-contained pickup cartridge. The embodiment of FIG. 25 is not applicable to cartridge VNC's because of the signal delay required to compensate for the spaced secondary stylus. A third cartridge to record surface contact device may optionally be used, such as a brush or damper of the prior art warp tracking devices mentioned above.

Figure 6:
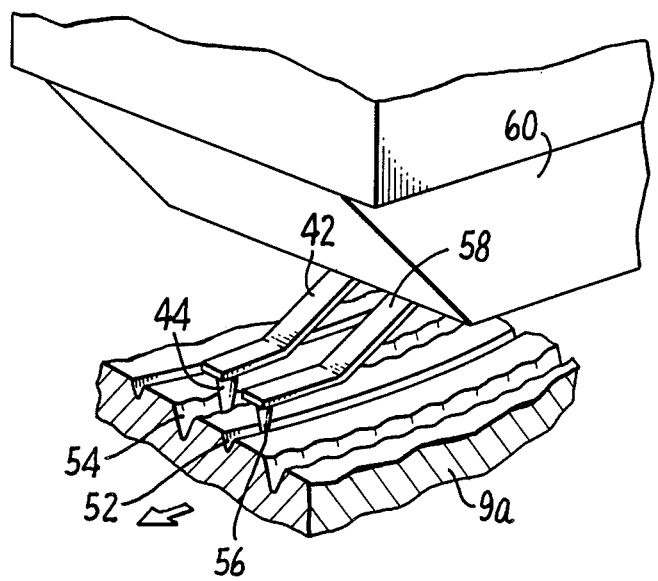
FIG. 6 is a partially cut away perspective view of one type of reference path-arm sensor.

An ideal reference path sensing method is shown in FIG. 6, in which a shallow unmodulated pilot groove 52 is provided adjacent the main information carrying groove 54 in a phonograph disc 9a. The tip 56 of secondary stylus 58 of cartridge 60 rides in the pilot groove and senses both vertical and lateral warp and rumble frequencies. The embodiments of the invention are then adapted to employ both the vertical and lateral information provided. Fortunately, lateral warp and rumble are not serious problems and it is sufficient in a practical system to deal with vertical components only.

Figure 7:
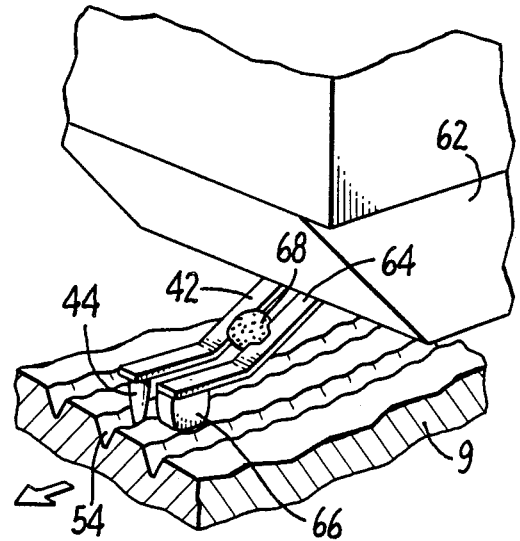
FIG. 7 is a partially cut away perspective view of yet a further type of reference path-arm sensor.

Referring to FIG. 7, in an arrangement suited to conventional commercial phonograph records, the cartridge 62 has a main stylus having a shank 42 and a stylus tip 44 tracking an information carrying groove 54 of a phonograph record 9. The secondary shank 64 and stylus tip 66 are situated on one or both sides of the main stylus and may fully or partially encircle it. The contact area may be biased towards the outsides of the record, if desired, so that pre-echo effects are minimized in the reference path information. The secondary stylus tip has a substantially flat bottom with operative dimensions sufficiently large (e.g. some fraction of a millimeter) so that it rides reliably on at least one land area and is thereby substantially unresponsive to lateral information and to any information content of the groove, responding only to the land height variations which are a measure of the warp and rumble. The tip 66 is guided laterally by the main stylus, and may be held in place by a compliant coupling 68 which generally maintains the relative positions of the two styli but does not interfere with the stylus movements.

Figure 8:
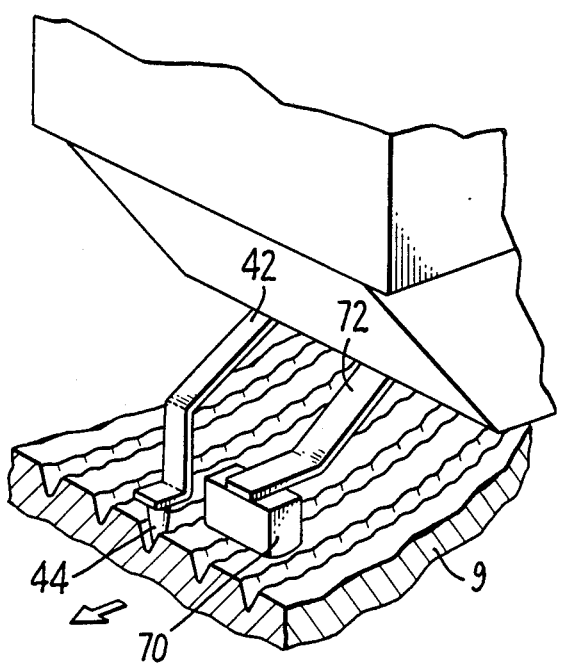
FIG. 8 is a partially cut away perspective view of still another type of reference path-arm sensor.
Figure 9:
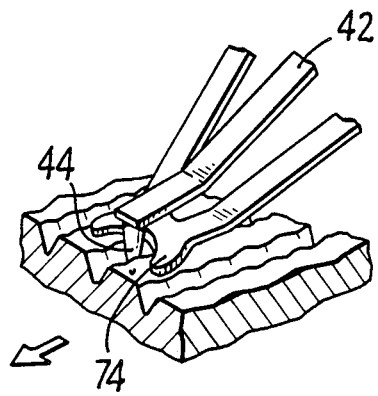
FIG. 9 is a partially cut away perspective view of the styli portion of another type of reference path-arm sensor.

Another view of the styli is shown in FIG. 8. An elongated block shaped tip 70 for secondary stylus 72 spanning the land between several grooves is located ahead of and to the outside of the main stylus 42. As mentioned previously, the secondary stylus tip may optionally have a U-shape (shown by way of example as element 74 in FIG. 9) or an O-shape, surrounding the main stylus. In FIG. 8, the contact area is shown biased towards the outside of the record so as to decrease pre-echo effects. A further practical matter is that the stylus arrangement should preferably not trap dust but should deflect it away.

In order to relax the mechanical design requirements for the cartridge of FIGS. 6–9 the secondary stylus may be spaced away from the primary stylus. Preferably, the secondary stylus is located in advance of the primary stylus in the sense of the phonograph disc rotation so that the primary and secondary styli signals can be made substantially coincident by appropriately delaying the secondary stylus signal. Thus the primary stylus may remain in its conventional location and its signal need not pass through a delay line which, if simple, might degrade the signal. If a suitable quality delay line is provided the primary stylus may be located in advance of the secondary stylus and the primary signal delayed.

FIG. 25 shows an exemplary embodiment in which a cartridge 60, held by tone arm 76 (shown cut-away), has a primary stylus, having a shank 42 and tip 44, and a secondary stylus, having a shank 42a and top 44a. The disc 9 direction of rotation is shown by the arrow. the secondary styles signal schematically applied to a delay circuit 280 which preferably receives as a variable delay control signal, a signal inversely related to the groove velocity. At 33 rpm, the disc velocity at the outside of the record is approximately 20 ips; for the inside, about 10 ips. Thus, a greater delay is required when the cartridge is tracing the inner grooves of the disc. A simple way to generate a signal inversely related to groove velocity is to derive a signal from the horizontal pickup arm position. Many techniques are well-known for generating a signal dependent on tone arm position. Also, variable delay circuits are well-known and particularly at audio frequencies are easily implemented. For example, a bucket brigade circuit with an oscillator frequency modulated by the tone arm position may be used. In the simplest case, a compromise fixed delay time may be used. The compromise value may be selected to favor the outer regions of the disc where pressing anomalies are greatest. For a stylus to stylus spacing of 0.1 inches, as an example, a delay of about 0.05 sec. would be nearly optimum for the outside of the disc and about 0.1 sec. for the inside.

Figure 1A:
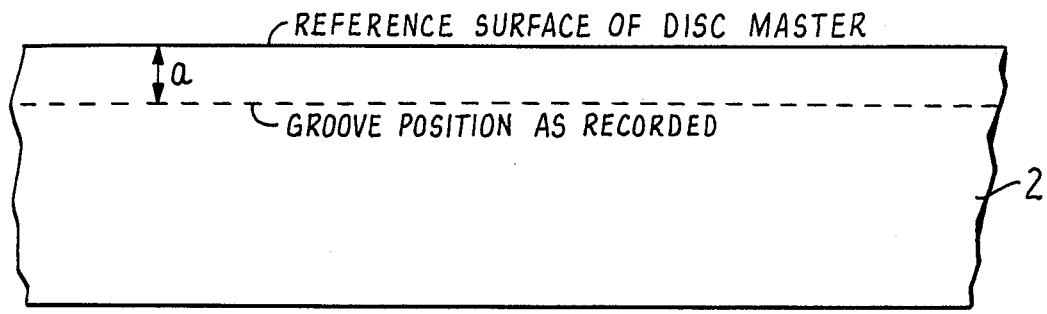
FIG. 1A is a sectional side view of the top half of a hypothetical record master on which silent grooves have been recorded.
Figure 1B:
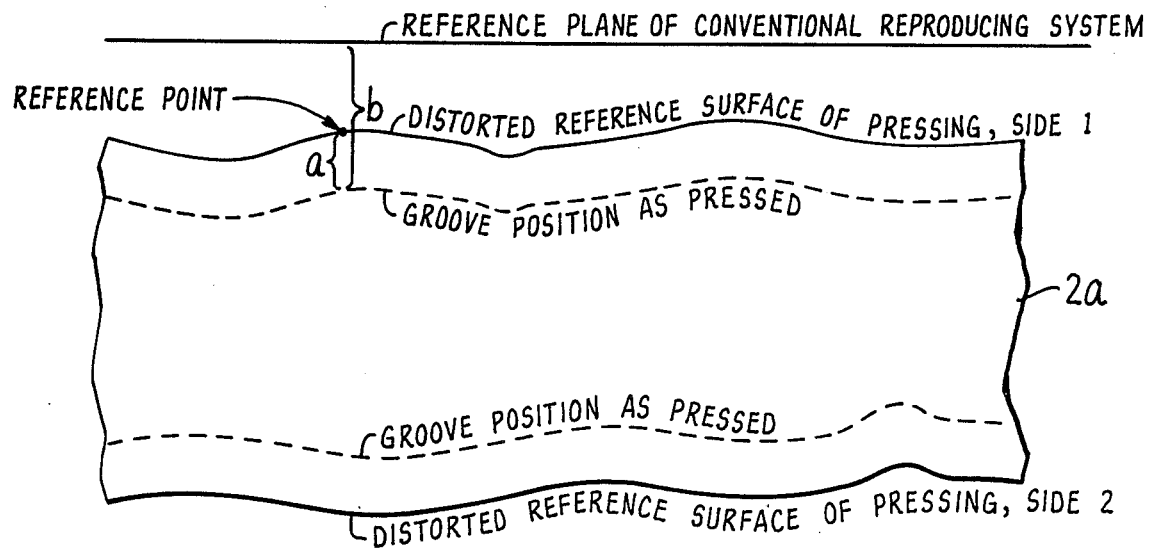
FIG. 1B is a sectional side view of a hypothetical record pressing made from the master disc of FIG. 1A.

Two suitable techniques for generating a signal indicative of tone arm position are disclosed in U.S. Pat. No. 3,937,476 to Sakai, which is incorporated herein by reference in its entirety. For example, in FIGS. 1 and 2 of Sakai, the tone arm position varies the capacitance of a variable capacitor which in turn controls the frequency of an oscillator. For the purposes of the present invention the discriminated and low pass filtered signal at the output of filter 14 is a suitable tone arm position signal. Note that the low pass filter would remove any high frequency components resulting from record eccentricity. In FIGS. 5–7 of Sakai a photoelectric arm position detector is disclosed. The signal from Sakai's converter 34 is suitable after low pass filtering by a filter such as filter 14 of Sakai's FIG. 2. The shape of Sakai's shutter 30 is preferably altered to linearize the arm position signal so that it follows Sakai's FIGS. 3D and 4D.

The technique of FIG. 25 is applicable to the cartridges and styli configuration of FIGS. 6–9, 22 and 23. It is also applicable to turntable, tone arm and pre-amp VNC's. It is applicable to the indirect sensing embodiment of FIG. 3B and FIG. 5 and to the direct sensing embodiments of FIGS. 4A and 4B. In each instance, the technique of FIG. 25 permits wider separation of the stylus and sensing area so that the requirements for physical closeness of the stylus and sensor means are relaxed.

For most tone arm and cartridge configurations, the design of the reference path-arm information sensors should be such that the tracking force of the main stylus should preferably comprise the main portion of the overall cartridge tracking forc in order to avoid affecting the side thrust forces on the cartridge and to avoid reducing the main stylus force available for tracking warps and large amplitude signals. A secondary stylus tracking force a small fraction that of the main stylus— e.g. ¼, 1/10, or even less—is adequate to sense the relatively low amplitude and low frequency rumble components. The secondary stylus is preferably compliantly connected to the cartridge body, the compliance preferably being substantially greater than that of the main stylus. The above compliance and tracking force considerations apply primarily to offset tone arm systems in which warp is not compensated. (In some systems the secondary stylus shank may relatively stiffly coupled the stylus to the cartridge body.) Further, the effective mass of the secondary stylus and related moving parts, together with the flexing or stiffness properties of the shank, should produce a high frequency resonance well above the highest mold of grain noise components of interest; thus a resonant frequency of at least 1-2 kHz would be suitable for the reference path sensor. As with the design of conventional signal cartridges, suitable mechanical damping can be applied to the secondary stylus. A low pass mechanical filter may be incorporated if desired, so that the information provided by the secondary stylus is band limited for reduced sensitivity to dust and surface scratches.

Information from the reference path-arm sensor is used in one way or another to cancel corresponding vertical information from the signal stylus. Wholly mechanical cancellation arrangements may be used, as hereinafter described. In the simplest arrangement, with a non-compliant secondary stylus shank, the vertical movements of the cartridge body subtract from the corresponding movements of the primary stylus. Alternatively, secondary stylus information may interact in the magnetic or electromechanical arrangements of the main signal transducer in such a way as to cancel error information. In some arrangements, a separate or coordinated transducer may be provided for the secondary stylus. The combination of signals, as by interconnected coils, may be accomplished within the cartridge itself or the signals may be brought out for external combination. The signals may be used internally and also brought out for use in other embodiments of the invention. For example, the high frequency components from the reference path sensor may be utilized internally or brought out to the preamplifier for mold grain noise reduction (cartridge VNC ro pre-amp VNC), and the low frequency components may be brought out for dealing with warp via actuation of the turntable or tone arm (turntable VNC or tone arm VNC).

REFERENCE PATH INFORMATION SENSING BY INDIRECT MEANS

As discussed previously, accurate reference path information sensing may be achieved directly, by means of a vertically fixed sensor. In an approximation, the vertical position of the tone arm may be used, by the methods known in the prior art. A transducer of the types previously mentioned in connection with FIG. 4B is mounted between the arm and vertical pivot so as to give an output related to the vertical position or angle of the tone arm and cartridge. This method of sensing is useful for providing reference path information below the arm-cartridge resonant frequency (e.g. 10 Hz). It is possible to employ a relatively stiffly mounted secondary stylus to raise the resonant frequency of the tone arm. The refernece path-arm sensors described previously in connection with FIGS. 5-9 and 25 are primarily useful above the resonant frequency. At or near the resonant frequency, phase and amplitude errors will be introduced into the reference path information by both of these methods. Hence, these methods are useful only at warp or rumble frequencies somewhat removed from the arm-cartridge resonant frequency—that is, normally below about 5 Hz and above about 20 Hz.

In an improved method, a substantially error-free warp and rumble sensing signal can be derived, enabling the corrective action to be applied over the whole frequency range of interest (e.g. 0.5 Hz up to several hundred Hz) without interference from arm/cartridge resonance. The method employs a combination of the first and second sensing methods described in the previous paragraph above (i.e., tone arm sensing and reference path-arm sensing) in a manner shown schematically in FIG. 3B. This approach is based on the recognition the both signals contain the same error signals (from arm-cartridge interaction effects), but in complementary form, whereby they can be cancelled to leave a difference signal accurately indicative of the warp and rumble. The vertical arm position signal x is an indication of the arm 76 to reference plane distance, whereas the reference path-arm signal y is an indication of the cartridge 78 to disc distance; the difference z is the warp and rumble amplitude; that is, $z = x - y$. The arm/cartridge resonance error signals contained in x and y signals from the tone arm sensor 80 and reference path-arm sensor 82 are cancelled in combiner 84, providing a substantially error free reference path information signal 86. The y signal can be derived by the various means which have been discussed, using either the signal stylus 78A, in some cases providing useful information up to about 30 Hz, or the secondary stylus 78B, by which useful information is obtained up to about several hundred Hz.

TURNTABLE VNC

Figure 10:
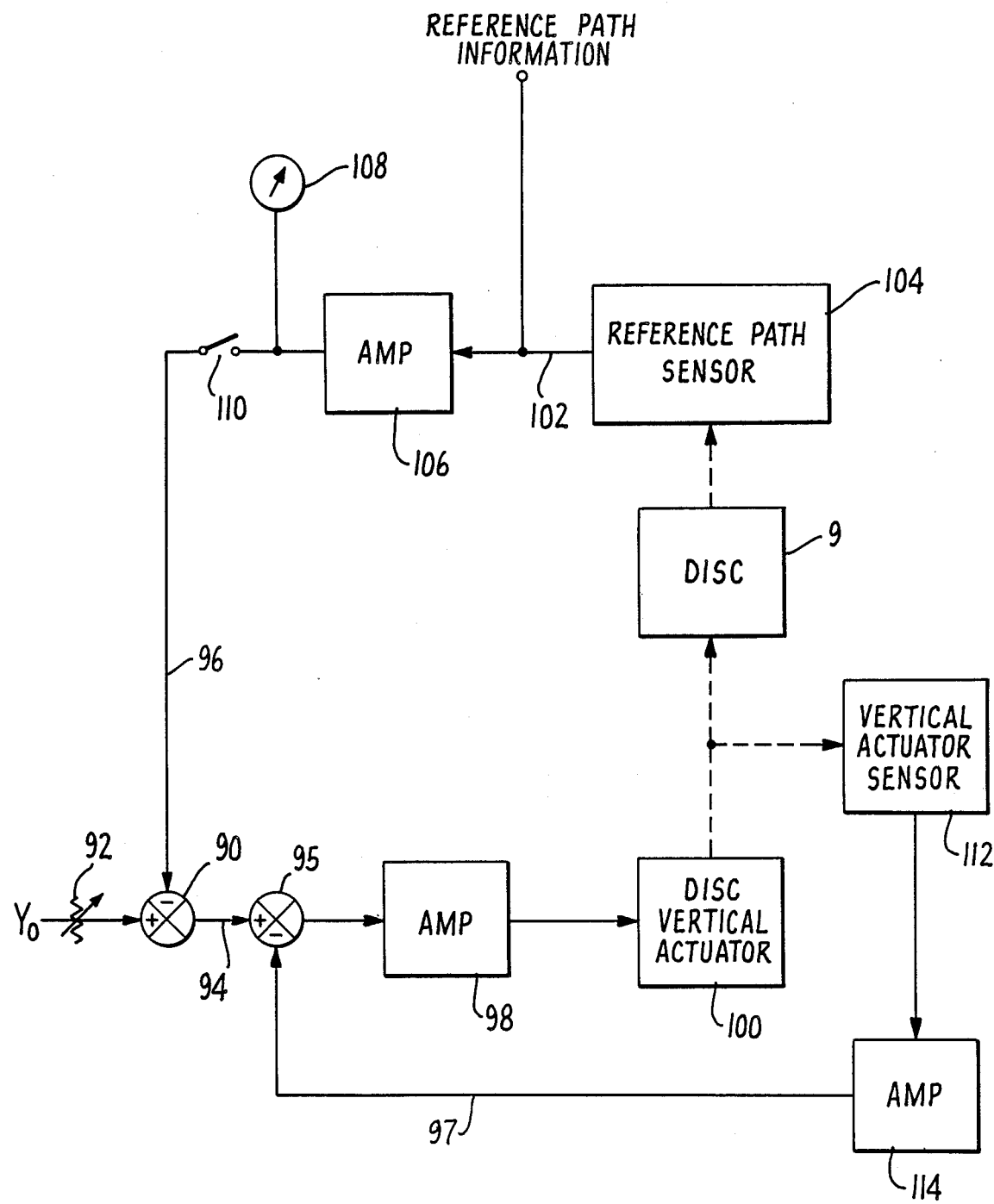
FIG. 10 is a block diagram of a turntable VNC (vertical noise compensator) system in accordance with the invention.

Referring to FIG. 10, a block diagram is shown of a turntable VNC (vertical noise compensator) embodiment of the invention, in which vertical position or displacement errors in the vicinity of the pickup transducer are sensed to control the vertical displacement of the disc in a closed loop servomechanism system. In effect, a reference plane for the disc is set by the bias displacement level $Y_o$ applied to adder/substractor 90. The reference plane may optionally by made variable by means of control 82. An error signal on line 94 is developed by subtracting the amplified reference path information signal on line 96 from the bias signal. The error signal is applied to an amplifier 98 and a vertical actuator 100 that controls the positioning of the disc 9 in a direction substantially normal to the disc surface, at least in the region of the signal stylus. A signal 102 relating to spurious vertical displacement of the disc in the vicinity of the pickup transducer is generated by the reference path sensor 104 and applied to the applied 106.

For reduction of warp, the feedback system should be effective at least in the frequency region of about 0.5 Hz through about 10 Hz. The system may be AC coupled, DC coupled or a combination thereof. For reduction of rumble and mold grain noise, the bandwidth of the correction action is extended into the audio range (e.g. up to several hundred Hz). The correction may be wholly mechanical, via the vertical actuator. Alternatively, the higher rumble frequencies (e.g. above 50 Hz) may be compensated via a cartridge VNC embodiment or a pre-amp VNC. If desired, a crossover network can be used to divide the treated frequency ranges appropriately. The overall system can thus make a significant contribution both to reducing warp and its side effects, and to reducing audible noise.

The spurious vertical displacement dealt with by the system may optionally be exhibited by display means 108. Switch 110 may optionally be provided to break the loop in order to switch off the correction action. Blocks 112 and 114 are described in connection with FIG. 11, below.

Means are required to control the disc position in response to sensed variations in the vertical disc position in the vicinity of the pickup transducer. The disc height may be varied uniformly across its surface or only in the vicinity of the pickup transducer. The necessary linear or angular motions may be accomplished via the disc, the turntable, the drive motor, or the whole motorboard assembly.

Figure 11:
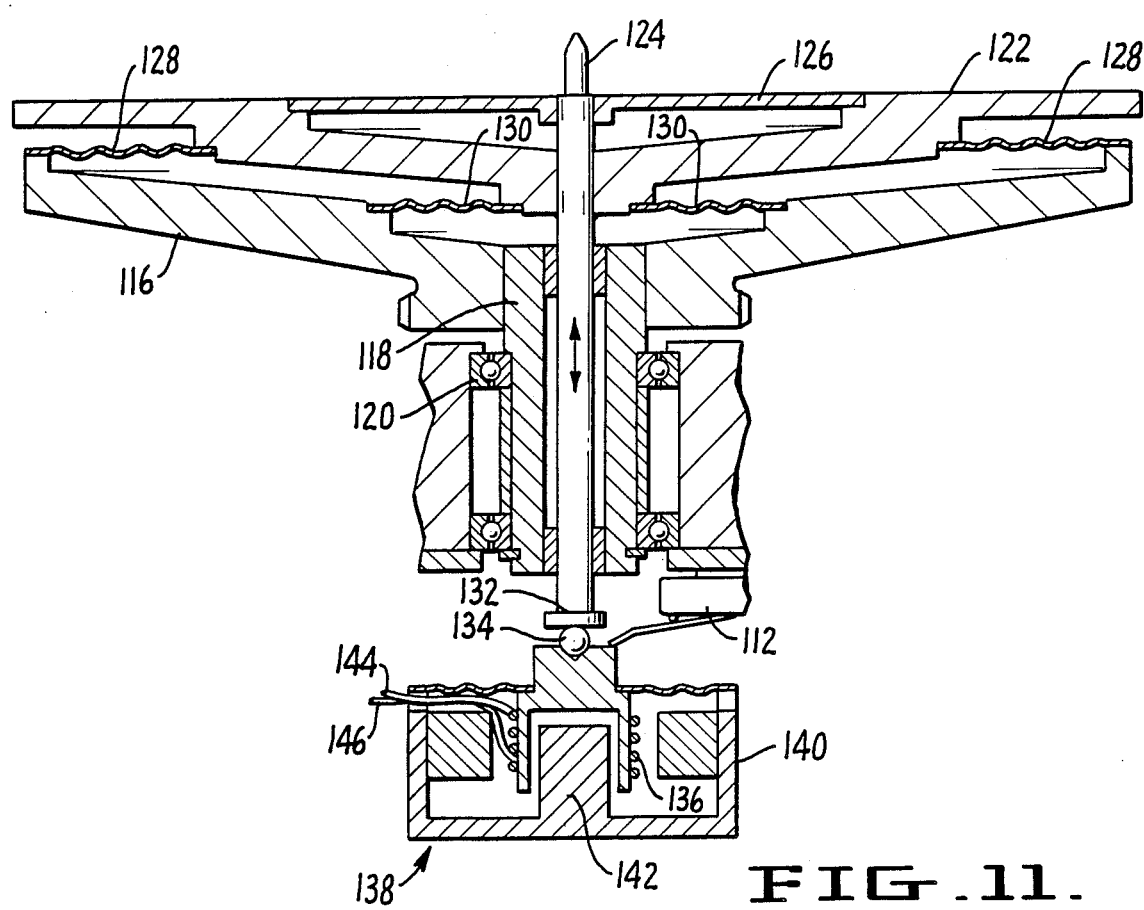
FIG. 11 is a cross sectional side view of one type of vertical actuator usable in a turntable VNC system.

A representative translational vertical actuator, resembling a woofer loudspeaker with a flat cone, is shown in FIG. 11. A metal platter 116 is supported by drive shaft 118 in bearing 120. Platter 116 is provided primarily for rotational mass, in order to reduce wow and flutter, and may be reduced in mass or even eliminated in some designs. The upper surface of platter 116 is conical to receive a light-weight phonograph record supporting turntable 122, which includes index pin 124. Turntable 122 may be partly hollowed out, with a cover member 126, to minimize weight. One or more "spiders", or annular sets of corrugated material 128 and 130, suspend turntable 122 from the platter 116. The corrugated material may be a light-weight fiber material of the type commonly used in loudspeaker suspensions. A push rod 132 passing through the center of drive shaft 118 riding on ball bearing 134 is driven by a moving coil 136 which forms part of a moving coil motor assembly 138, used here as a motion transducer for push rod 132. Assembly 138 includes permanent magnet 140 and a tubular core 142 suspended from the magnet 140 to carry winding 136 in proper relation to the magnet. Supply leads 144 and 146 are driven by amplifier 98 (FIG. 10). Springs or other such support means may be provided to balance the weight of the turntable assembly and to vertically center the motor unit 138.

Turntable 122 is preferably of very light-weight material, such as foamed plastic, to minimize the mass required to be moved by the transducer 138. Also, the push rod to drive shaft interface friction is reduced as low as practicable by using a nylon or other low friction bearing, for example. Such bearings may be dispensed with in some designs, particularly if an additional spider is used at the bottom of the pushrod 132. Other types of mechanical coupling, such as hydraulic and pneumatic, may also be used.

The motor assembly 138 preferably provides a positive displacement output for a given electrical signal input; this avoids mechanical resonances of the system. This type of performance may, for example, be provided by enclosing the motor unit itself within its own servo loop, preferably including a motor position sensor such as 112 in FIG. 10 (and FIG. 11) and a suitable amplifier 114. Alternatively, if the motor unit simply provides an essentially undamped force, then it is necessary to provide an appropriate amount of passive damping; this, however, requires a large amount of drive amplifier power. A more practical method is to ensure that the masses and compliances of the turntable assembly result in a resonant frequency either well below or well above the frequency range of interest. The resonant frequency might be placed at about 50 Hz, for example, to provide a well controlled behavior up to about 20 Hz. Passive mechanical damping using viscous materials may be employed as required. These considerations also apply to the further turntable VNC embodiments to be described. Such passive displacement control methods do not interfere with operation of the record player when the VNC is switched off; this is not the case, however, with the tone arm VNC embodiments to be described in which electronic servos are preferred so that the arm may be handled manually and can track normally when the VNC is switched off.

Figure 12:
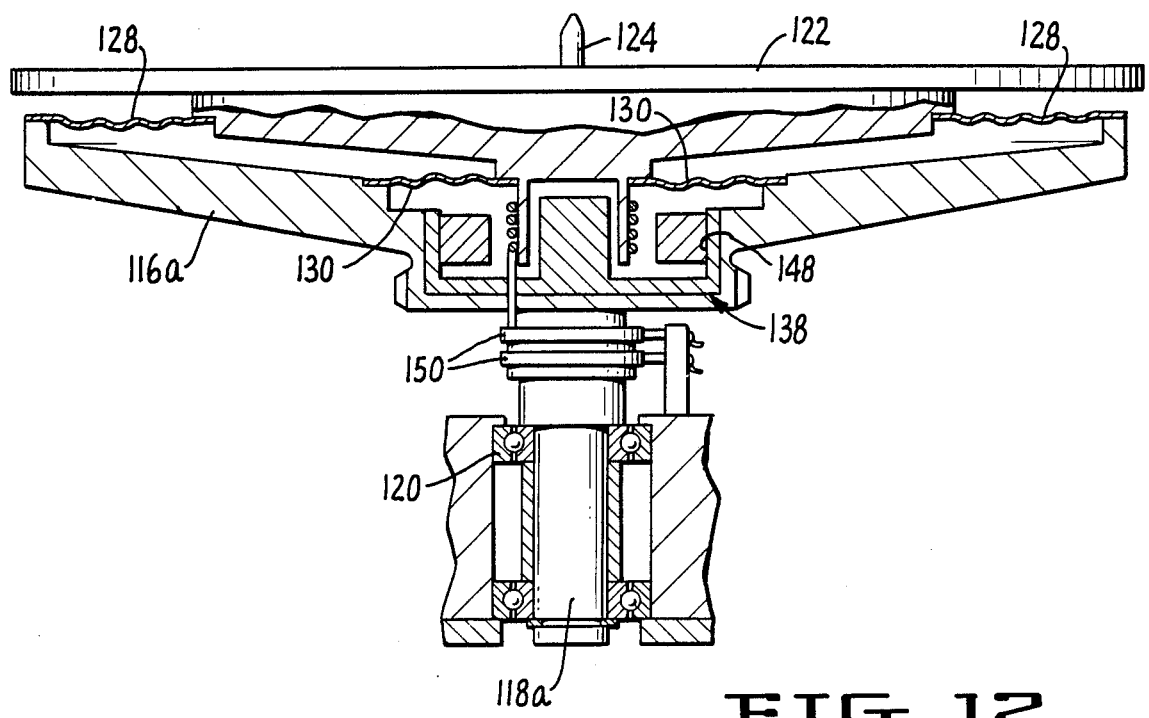
FIG. 12 is a cross sectional side view of a further type of vertical actuator usable in a turntable VNC.

In an alternative embodiment of the vertical actuator, shown in FIG. 12, the transducer 138 is located in a cylindrical cut out 148 in modified platter 116a. Thus, the transducer 138 rotates along with platter 116a. The push rod is thus eliminated, along with its mass and friction. However, in order to power the motor assembly 138, a pair of slip rings 150 or other electrical transmission means is provided.

Alternatives to the vertical translation mechanisms which have been described are directed to controlling the disc height only in the vicinity of the pickup transducer. Such method may controllably rock or tilt the turntable so as to provide vertical movement along the line traced by the pickup cartridge.

Figure 13:
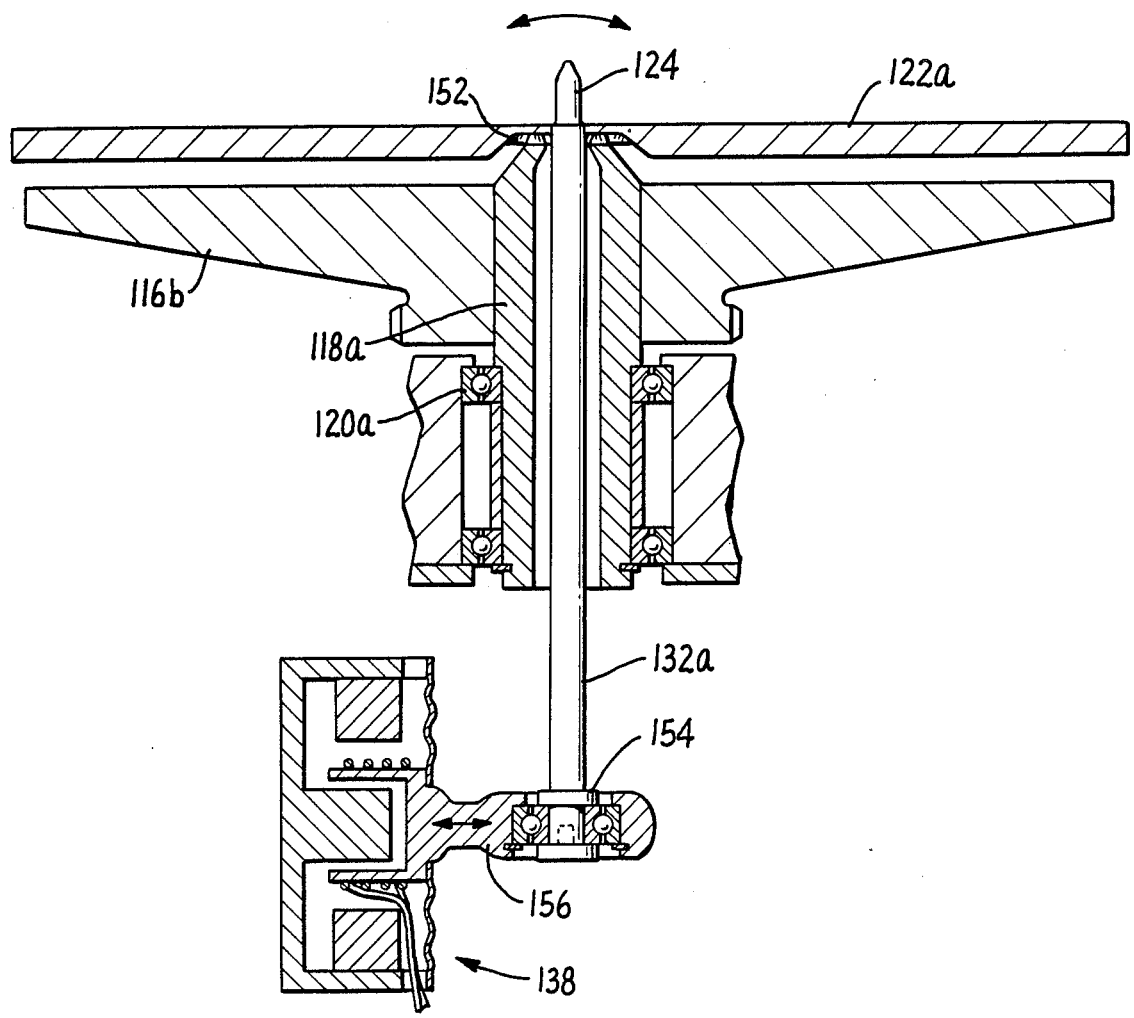
FIG. 13 is a cross sectional side view of yet a further type of vertical actuator usable in a turntable VNC system.

In the example of FIG. 13, a tiltable phonograph supporting turntable 122a is spaced above a metal platter 116b. Platter 116b is provided only for rotational mass, in order to reduce wow and flutter if necessary, and may be dispensed with in some designs. Turntable 122a has a downward conical annular portion 152 that is coupled to platter 116b for rotary motion but permits rocking or tilting of the turntable. Drive shaft 118a for platter 116b, powered by a suitable rotational drive motor, is seated in bearings 120a. A hollow center is provided in drive shaft 118a for tilt rod 132a that terminates in turntable 122a and index pin 124. Tilt rod 132a is coupled by a rotary joint 154 and rod 156 to a moving coil motor assembly 138, of the type described above, located to provide lateral motion to the bottom end of rod 132a and hence, to tilt turntable 122a.

Alternatively, the entire turntable and drive motor assembly can be tilted relative to the tone arm and cartridge, in the manner of the embodiment of FIG. 14A. A turntable 158 driven by a motor 160 through drive shaft 162 is supported by sub-base 164 suspended by compression springs 166, 168 from a base 170, to which the arm and cartridge assembly 172 is mounted. A moving coil transducer assembly 138 controllably moves one end of the sub-base 164 to tilt the turntable relative to the arm/cartridge assembly.

In a variation of the arrangement of FIG. 14A a displacement transducer is located so as to move vertically the turntable and drive shaft, possibly including the drive motor. For economy, the displacement transducer may be made a part of the drive motor. FIG. 14B shows an arrangement in which the entire drive motor and turntable are moved vertically. A corrugated annulus 130a, similar to material 130, suspends the motor 160 from an annular support 171 from the motorboard 164 to permit vertical movement.

Further tilting embodiments useful as retrofits for existing turntable structures are shown in FIGS. 15A and 15B. A conventional turntable 164a, driven by shaft 162a, has a tilting surface assembly 174 resting on its top surface. Assembly 174 includes a tilting turntable member 176 generally coextensive with the size and shape of the underlying existing turntable 164a and having an extended periphery with downward depending edges. Turntable 176 has a downward depending conical annular portion that contacts a cone shaped member 177 that ships over the index pin 179 on the underlying turntables 164a and spaces the extending portions of turntable 176 above the underlying turntable to permit tilting. In order to provide rotational coupling between the turntables, an annulus 178, of sufficient weight and surface friction to couple securely to the underlying turntable surface, is coupled to a hollowed out under portion of the turntable 176 by means 180 that are rotationally rigid yet yieldable to rocking motion. Corrugated material such as described above in connection with FIGS. 11 and 12 is suitable. The downward depending edges 182 of the upper turntable are metallic so that an electromagnet 184 arranged to controllably pull on the edge at one location controls the turntable tilt.

In FIG. 15B, an alternative rocking mechanism 183 engages the top of a record 185, being placed in position after the record is put on the turntable. A linear motor 138, as described in relation to FIG. 13, provides the required rocking action through rotary joint 154.

For simplicity in retrofitting such warp compensation devices, the warps themselves may be sensed in an approximate fashion at the record edge, at a position substantially where the pickup cartridge intersects the record, using a lamp and photocell assembly 192. This sensing approach is most accurate at the record edges where warp is greatest. Other sensing means as described above, can be used if greater accuracy is desired.

An advantage of a disc reproducing system employing a turntable VNC, particularly of the vertical translation types of FIGS. 11, 12 and 14B, is the possible use of a tone arm essentially fixed vertically and mounted only for lateral movement relative to the record. This simplifies reference path sensing, which may be done directly, as in FIGS. 4A and 4B. It also follows that if a pivot is used either for accommodating any residual vertical motion of the disc or for placing the stylus on the disc, the pivot can be situated very close to the cartridge without fear of introducing warp wow. If desired, the vertical actuator may be controlled so as to effect engagement and disengagement of the record and the cartridge. The vertical actuator can thus eliminate the need for an automatic lifting mechanism associated with the tone arm.

The substantial elimination of record warp by turntable VNC reproducers is accompanied by a corresponding reduction in the many problems previously mentioned in relation to warp. Moreover, the effective existence of "warp-free" records makes possible the design of tone arms, pickup transducers, and signal styli taking this operating condition into account. For example, it will be easier to optimize the design of an offset tone arm which is required to move in a substantially lateral direction only. The reduced tracking pressure and maximum excursion of the stylus result in a different set of electromechanical parameters for cartridge design. The latter observation applies also to the tone arm VNC reproducers to be described below.

TONE ARM VNC

Figure 16A:
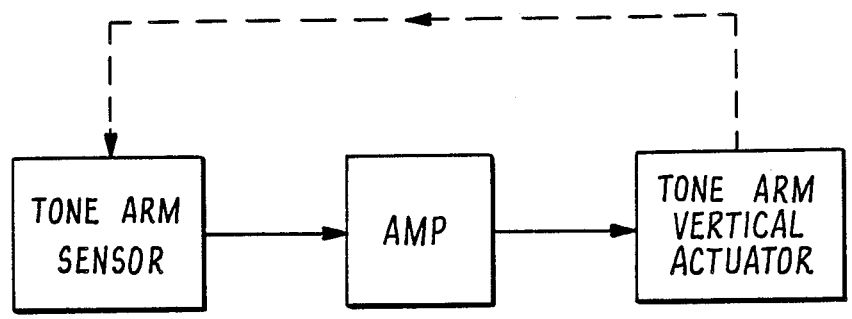
FIG. 16A is a block diagram of a prior art electrical tone arm damping arrangement.
Figure 16B:
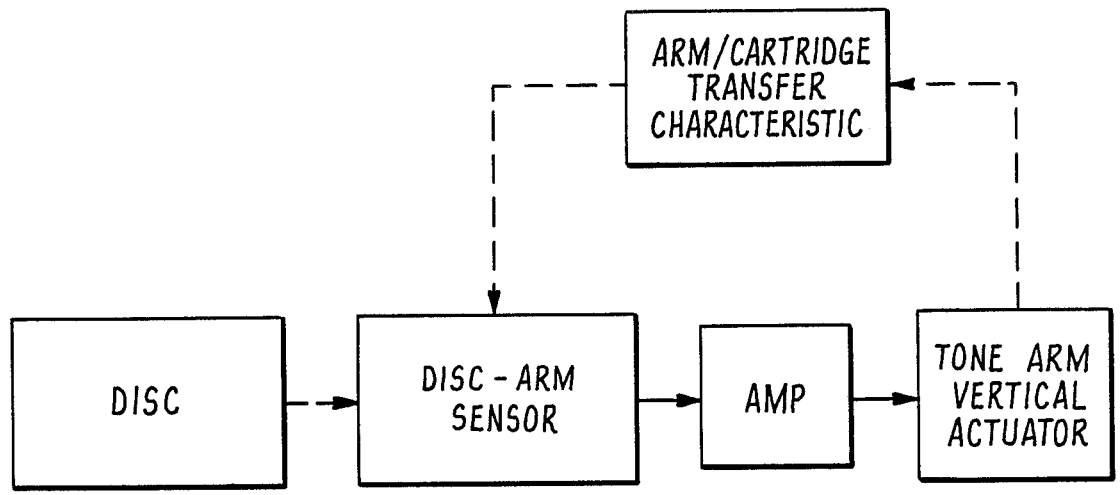
FIG. 16B is a block diagram of a prior art tone arm servo arrangement.

Prior art feedback tone arm systems are laid out in the manner of FIGS. 16A and 16B. The tone arm vertical actuator is an electromechanical transducer so arranged to apply a force to the tone arm or cartridge in a direction normal to the disc surface, in response to an electrical signal from the sensor and amplifier. A further motor unit can be employed to perform similarly on a horizontal basis (or 45°/45°).

In one prior art version shown in FIG. 16A, a tone arm sensor is arranged to monitor the vertical velocity of the tone arm; the negative feedback loop thereby acts to provide damping for the tone arm. The damping depends on loop gain, which must not be so high as to interfere with the tracking of warps, which are tracked passively. The overall result is that the tone arm/cartridge resonance effects are reduced but that the feedback loop does not directly enter into tracking of the disc surface.

In other prior art versions, shown in FIG. 16B, the attempt is to employ a servo loop to track the warps actively. The distance between the tone arm and disc surface is sensed either by a separate transducer or via the cartridge output signal. This signal includes the arm/cartridge resonance characteristics; the uncertain and rapid changes of loop phase and gain in the region of resonance makes compensation difficult, limits the loop gain which can be used, and seriously interferes with the effectiveness of the servo action. The prior art feedback tone arm techniques are thus only partially effective in dealing with the problems of record warp.

Figure 17:
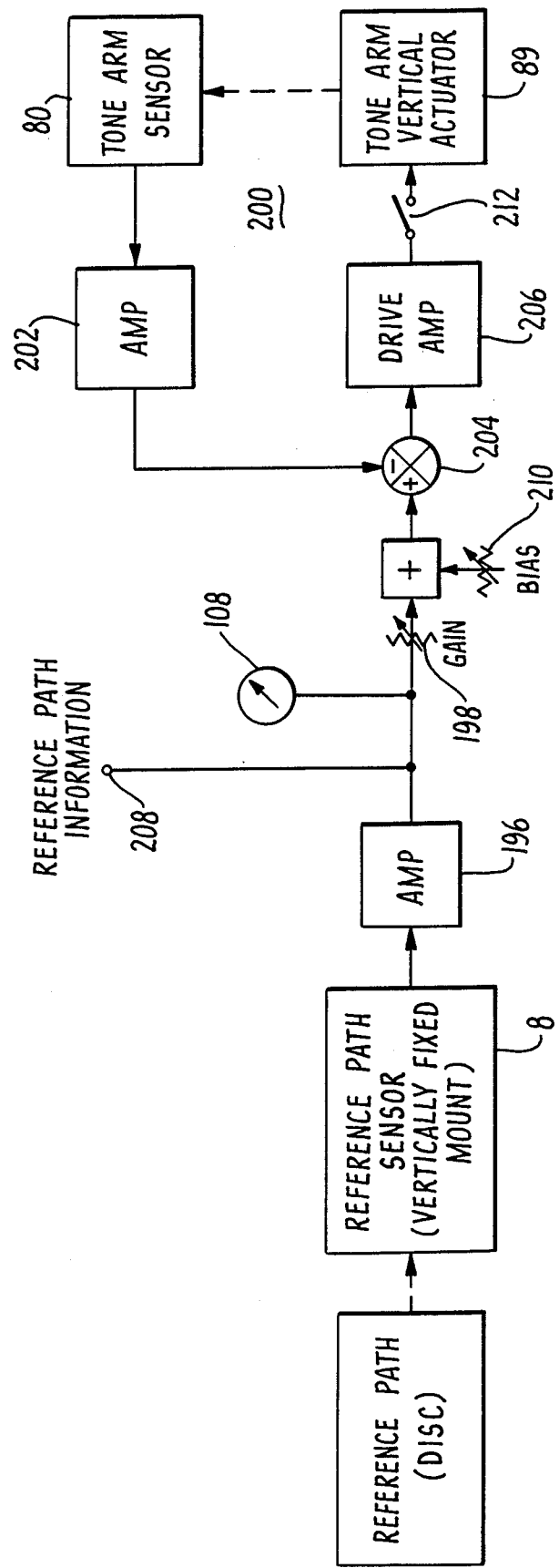
FIG. 17 is a block diagram of a tone arm VNC system according to the present invention employing direct reference path sensing.
Figure 18:
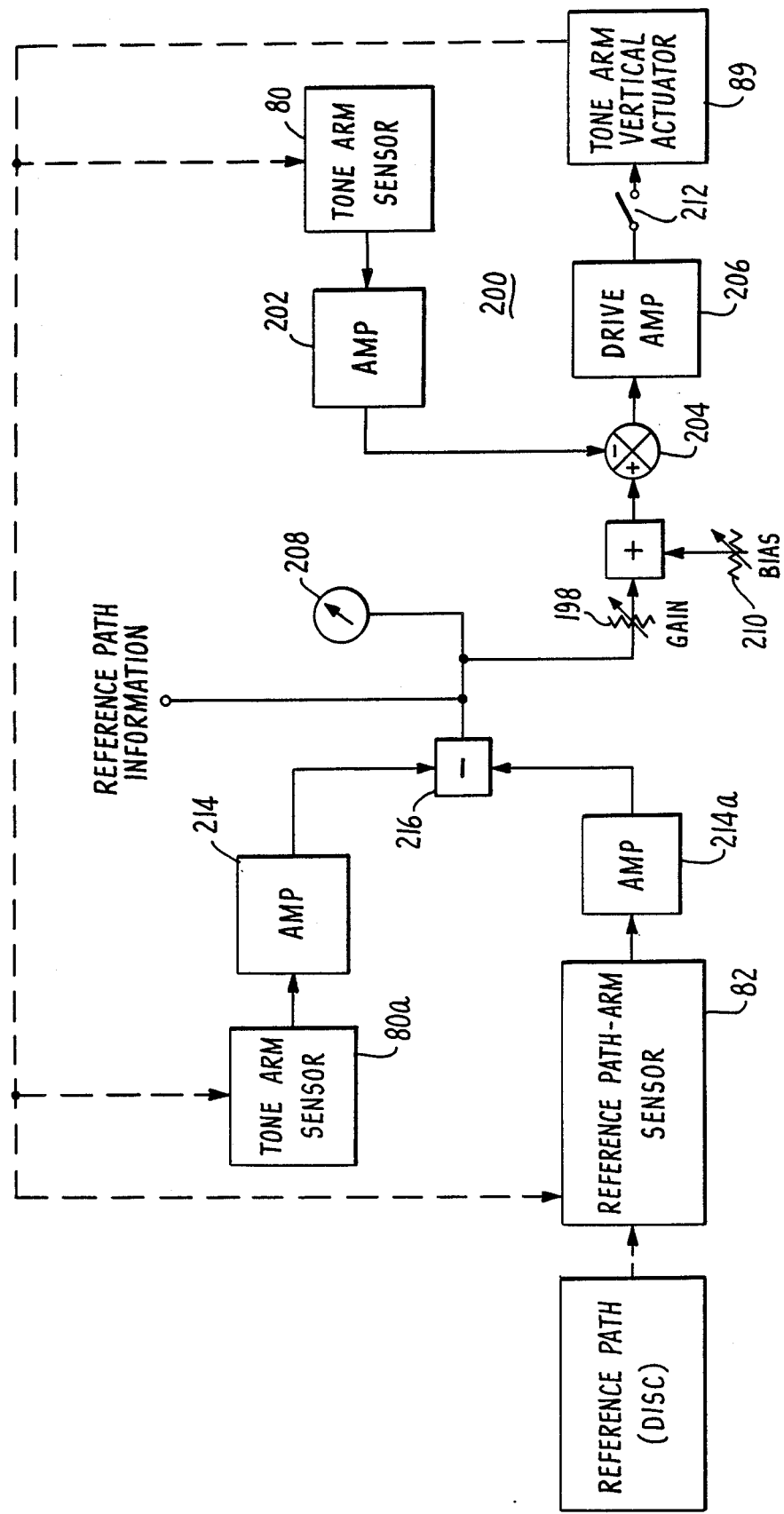
FIG. 18 is a block diagram of a further type of tone arm VNC system in accordance with the present invention in which indirect reference path sensing is employed.
Figure 19:
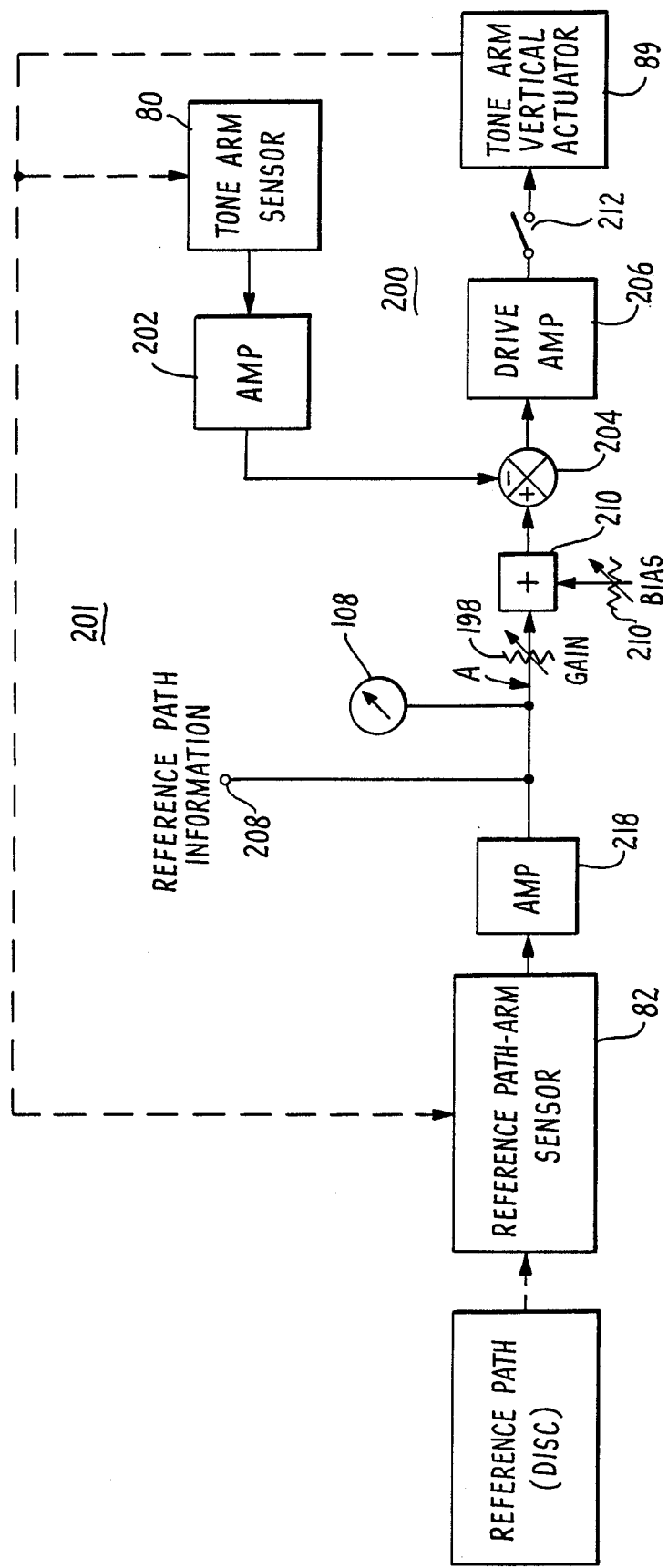
FIG. 19 is a block diagram of a further type of tone arm VNC system according to the present invention in which the error signal is included in a negative feedback loop.

Improved tone arm systems in accordance with the present invention are shown in FIGS. 17, 18 and 19. FIGS. 17 and 18 utilize the improved direct and indirect error sensing methods, shown in FIGS. 3A and 3B, respectively, which effectively eliminate the effects of arm/cartridge mechanical resonance from the error signal. The embodiment of FIG. 19 employs a double closed loop in such a manner that the sensed reference path-arm information is caused to be substantially the same as reference path information, thereby eliminating resonance effects. In some of the embodiments, both vertical and lateral operation (or 45°/45°) are possible, but for simplicity the discussion will be confined to vertical operation only.

The embodiment shown in FIG. 17 employs an open loop and direct sensing of the reference path via a transducer 8 which is independent of vertical movements of the cartridge; this type of sensor is illustrated in FIGS. 4A and 4B. The reference path information is amplified in amplifier 196 and applied to the tone arm (cartridge) vertical actuator 89, which may be a moving coil motor unit as in the feedback tone arms of the prior art. The signal polarity and gain are set to provide a vertical drive to the cartridge body corresponding to the warp and rumble undulations of the disc surface, a condition which will result in zero, or at least a minimum output from the signal cartridge at least in the warp frequency range. Depending on the gain setting, the system may also undercorrect or overcorrect vertical errors. When the gain is optimally set by gain control 198, the system will be able to effect correction through and above the arm/cartridge resonant frequency region only if the arm displacements are positively related to the reference path information signal. That is, the arm must be damped, either mechanically or electrically, so as to eliminate the arm/cartridge resonance and obtain a positive displacement effect. The actuator damping and/or servo considerations discussed previously in relation to the turntable VNC embodiments are relevant here. An exemplary servo loop 200 around the tonearm vertical actuator is shown at the right-hand portion of FIG. 17 and includes a tonearm vertical movement sensor 80 (the transducer is of the type described in connection with FIG. 4B, however arranged to sense tonearm vertical movement) amplifier 202, adder/subtractor 204 and actuator drive amplifier 206. The gain and other characteristics of the loop 200 are set to obtain good overall warp and rumble compensation performance up to, say, 20 Hz, with higher frequencies of reference path information being tapped off at 208 and utilized more conveniently in a pre-amp VNC, to be described. It should be noted that the actuator servo 200 is isolated and used only to obtain a positive displacement effect in the present invention, so that much higher values of loop 200 gain may be employed than in the closed loop arrangements of the prior art. The first prior art embodiment mentioned uses the actuator loop only to damp the tone arm and not as part of an overall servo system. The other prior art loops include the arm/cartridge transfer characteristic, severely limiting the usable gain before oscillation.

Switch 212 permits opening of loop 200 to deactivate the system for test or demonstration purposes. Display means 108 allows the reference path information to be observed.

Tone arm VNC embodiments may be AC coupled, DC coupled, or a combination thereof. A bias control (such as 210 in FIG. 17) can be used to set stylus force and/or to raise and lower the stylus. In an AC-only system the tracking force can be mechanically determined, as with conventional tonearms; a bias control may, however, optionally be employed to override the error signal for raising and lowering purposes.

FIG. 18 shows a further open loop tonearm VNC in which a reference path information derivation system of the indirect type shown in FIG. 3B is employed. The gains of amplifiers 214 and 214a are set to conform to the conditions shown in FIG. 3B, whereby substantially pure reference path information is obtained, unadulterated by arm/cartridge resonance effects. The operation of the system is essentially the same as that of the open loop system of FIG. 17. Under, over, or optimal correction can be obtained, depending on the setting of the gain control. As in the system of FIG. 17, there are no particular constraints on the gain or other properties of the tonearm actuator servo loop 200. Actuator damping is required only to ensure effective warp and rumble compensation, not to prevent oscillations. Thus, the loop 200 gain is set to provide adequate damping or a positive displacement effect of the vertical actuator, in order to yield a good warp and rumble compensation in the frequency range of interest (e.g. up to 20 Hz).

For economy, tonearm sensors 80 and 80a may be the same sensor. Likewise, amplifiers 202 and 214 may be the same amplifier, with attenuation as required to provide appropriate levels (gains) at the inuts of the combining networks 216 and 204.

FIG. 19 shows a version of a tone arm VNC in accordance with the invention in which the warp and rumble error signal itself is enclosed within a negative feedback loop. The loop automatically provides tone arm movements which correspond to those of the disc surface. As in the previous embodiments, it is essential that the correct error signal should be employed—i.e. reference path information without interference from arm/cartridge resonance effects.

Consider the operation of the system of FIG. 19 if the outer loop 201 were broken at point A. The arm would remain stationary throughout the frequency range of concern (0.5 Hz–20 Hz), provided that sufficient gain is employed in the vertical actuator servo loop (inner loop 200); the gains of amplifiers 202 and 206, for example, may be set to ensure this condition without fear of oscillation, as there are no unusual oscillation provoking elements within the inner loop. Under this condition the output of the reference path-arm sensor is pure reference path information. If the outer loop is then closed at point A the arm will follow the reference path but at an amplitude depending on the overall outer loop gain. The gain of amplifier 218 may be set to provide the desired factor of reduction in output from the reference path-arm sensor, which, it should be noted, provides pure reference path information but at a reduced amplitude. Thus, the invention remedies the problems of the prior art tone arm feedback systems (FIG. 16B) in effectively eliminating the troublesome arm/cartridge transfer characteristics from the feedback loop, whereby the arm is actuated by and follows the reference path.

CARTRIDGE VNC

Figure 20:
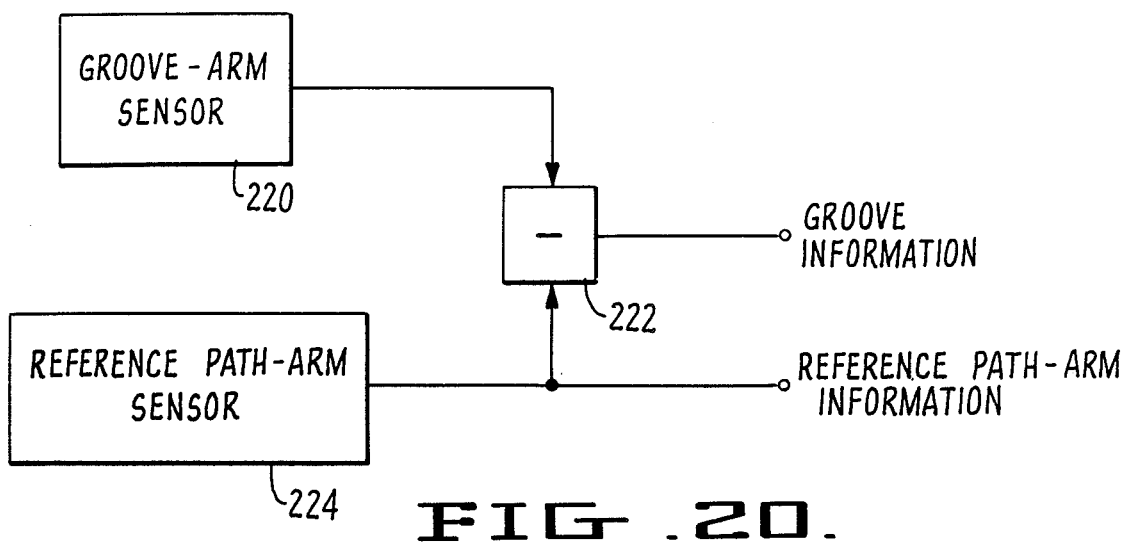
FIG. 20 is a functional block diagram of a cartridge VNC according to the present invention.

FIG. 20 shows a functional block diagram of cartridge VNC embodiments of the invention. Warp, rumble, and mold grain noise from the main stylus (groove-arm sensor 220) are cancelled from the output signal in one way or another by arrangement 222, which may, for example, be mechanical, magnetic or electrical in nature, using the error information provided by the reference path-arm sensor 224. This is preferably accomplished entirely within a unitary dual stylus cartridge assembly. The operating parameters can thus be fixed and pre-set by the cartridge manufacturer, whereby installation either on an original or replacement basis is a simple matter.

Figure 21A:
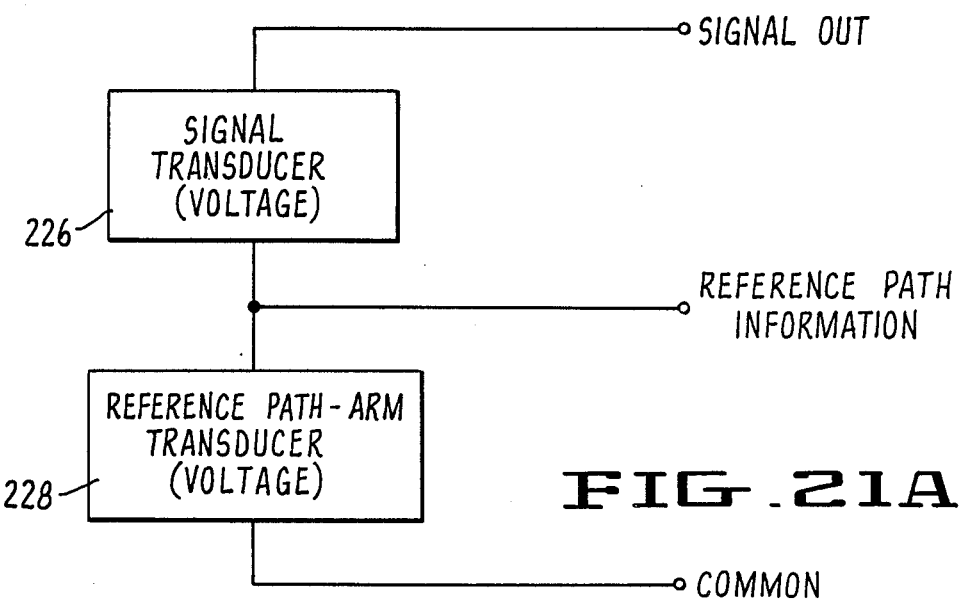
FIG. 21A is a block diagram showing exemplary combination interconnections between transducers in a cartridge VNC according to the present invention.
Figure 21B:
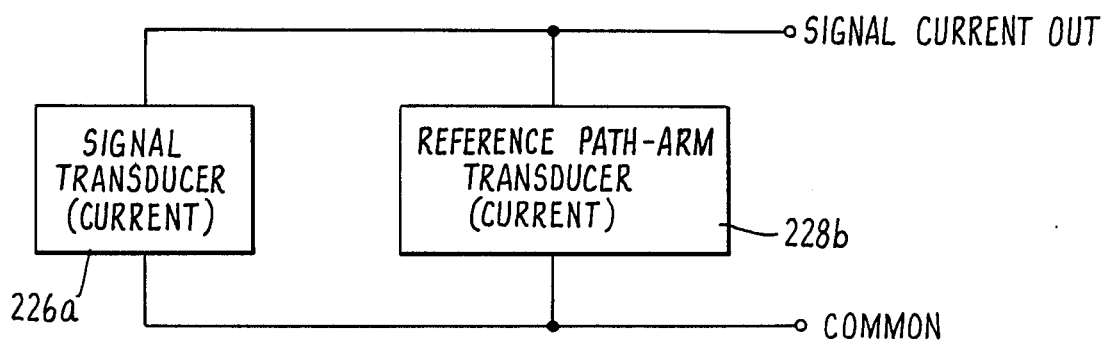
FIG. 21B is a block diagram showing an alternative exemplary combination interconection between transducers in a cartridge VNC according to the present invention.
Figure 22:
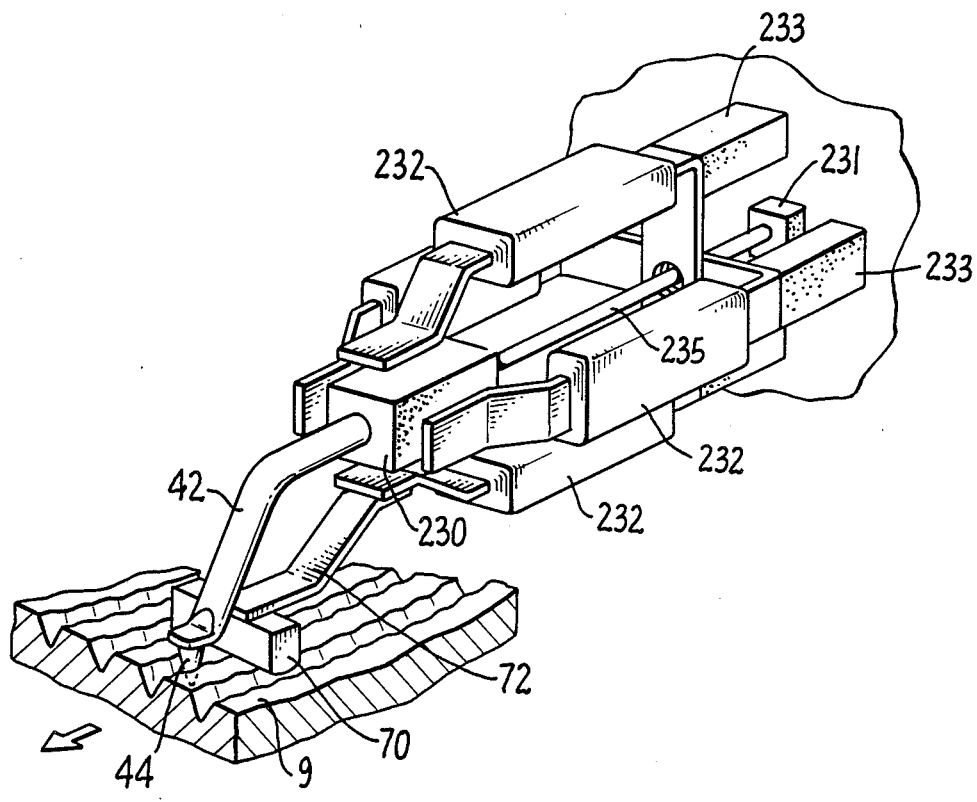
FIG. 22 is a perspective view of a portion of a cartridge VNC.

The reference path-arm sensor 224 may be of the types previously discussed and shown in FIGS. 5-9. Two independent sets of transducers 226 and 228 (e.g. magnets and coils) may be provided within the cartridge, as illustrated schematically in FIGS. 21A and 21B, which show exemplary combination interconnections. The transducer outputs may be further divided to accommodate the left and right signals. A low pass electrical or mechanical filter may be provided (e.g. 300 Hz low pass), with external control of the characteristics, if desired, to reduce any non-rumble or non-mold grain noise components sensed by the secondary stylus, such as might be caused by scratches or rough groove edges. Reference path information terminals, shown in FIGS. 20 and 21 may be provided, whereby low frequency components may be utilized by turntable VNC or tone arm VNC embodiments In a further version, shown by way of example in FIG. 22, the secondary stylus shank 72, instead of coupling to its own transducer, is coupled to the stator components of the signal transducer, so that rumble information sensed by the secondary stylus 70 cancels out rumble information sensed by the primary stylus 44. That is, for rumble frequencies there is no relative movement between e.g. the iron or magnet 230 and the coils 232. Various other analogous cancellation arrangements may be employed, using moving coils, moving iron, moving magnets and the like. Two like armature elements may share the same stator environment, such as two coils, each associated with its stylus, sharing a common magnetic field.

The aforementioned stator components of the signal transducer may include the cartridge body itself. However, for optimum noise cancellation, the mass to be displaced by the secondary stylus should be as low as possible. Thus, the signal stylus and the secondary stylus preferably have independent compliant connections 231 and 233 to the cartridge body. For optimum tracking, the secondary stylus preferably accounts for the lesser portion of the overall cartridge tracking force and the lesser portion of the overall vertical stiffness.

Figure 23:
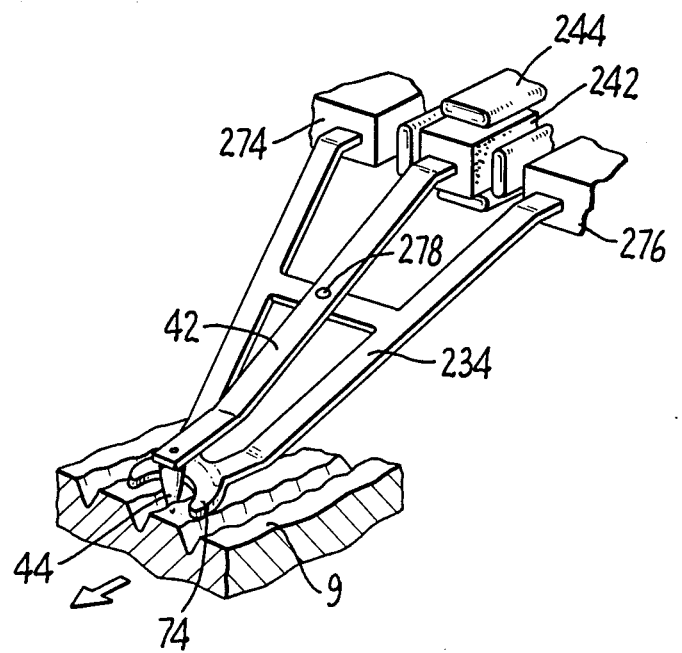
FIG. 23 is a perspective view of a portion of a further cartridge VNC.

Further mechanically coupled arrangements are possible in which the movements of the secondary stylus cancel corresponding movements of the principal stylus. One example is shown in the embodiment of FIG. 23, wherein a U-shaped stylus tip 74 partially surrounds the main stylus tip 44. An A-shaped shank 234 connects tip 74 to first and second members 274 and 276 that are fixed relative to the cartridge. The main stylus shank 42 is attached to the cross piece of shank 234 at point 278. The distal end of shank 42 is connected to a conventional magnet or iron piece 242 which cooperates with coils 244. In operation, secondary stylus 74, riding on more than one land area adjacent the groove engaged by main stylus tip 44, responds to rumble frequency components and cancels movements of magnet 242 due to corresponding responses of the main stylus.

PRE-AMP VNC

Figure 24:
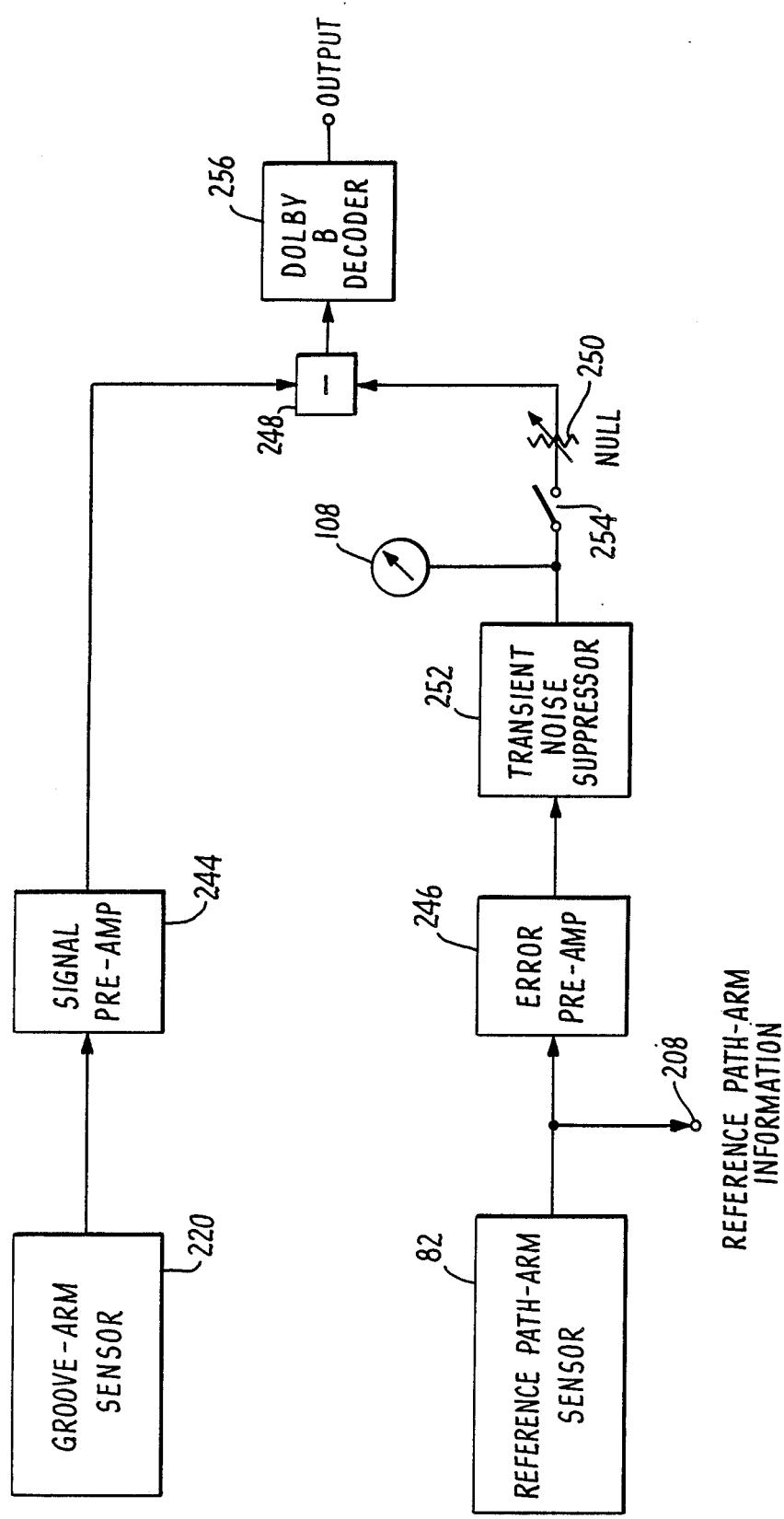
FIG. 24 is a block diagram showing a pre-amp VNC.

The reference path-arm signal may be combined with the main stylus signal in the electronic manner shown in FIG. 24. This embodiment function in essentially the same manner as the cartridge VNC described previously and is primarily applicable to sensors of the types shown in FIGS. 4A and 4B, and 5, or to separate transducer versions of FIGS. 6–9 and 24. Each sensor has a respective pre-amplifier 244 and 246. The null control 250 is set for optimum noise cancellation in combiner 248. If desired, electrical filtering, signal delay correctors or other processing may be inserted into either or both signal chains in order to optimize the noise reduction effect under all operating conditions. For example, a transient noise suppressor 252 can be employed to reduce the effect of "pops" and "clicks" caused by scratches on the record and the like.

The signal on the disc being reproduced can be encoded in electronic noise reduction form, for example using high frequency compression in order to reduce high frequency noise when played back, using high frequency expansion by means of a system known as "Dolby B" or "Dolby C". Such high frequency noise reduction will be most effective psycho-acoustically when combined with low frequency disc noise reduction as provided by the various embodiments of the invention. The system of FIG. 24 can provide for playback of a Dolby B encoded disc by optionally providing a Dolby B type decoder 256, preferably following subtractor 248 or, less desirably, in the signal chain of blocks 220 and 244 before subtractor 248.

What is claimed is:

1. In a system for reproducing phonograph records having a movable tone arm carrying a cartridge and pickup stylus, having an arm-cartridge resonant frequency, for tracking the record groove, apparatus for deriving reference path information as to the vertical location of an unmodulated surface of the record in the vicinity of the pickup stylus comprising
   means for sensing the vertical location of the movable tone arm to provide tone arm information which includes arm-cartridge resonant effects,
   means for sensing the support arm to unmodulated record surface distance in the vicinity of the stylus to provide refernece path-arm information which includes arm-cartridge resonant effects,
   means for time delaying said reference path-arm information, and
   means for combining said tone arm information and reference path-arm information out of phase to provide reference path information wherein arm-cartridge resonant effects are substantially reduced.

2. The combination of claim 1 wherein the support arm to unmodulated record surface distance is sensed more than about 1 millimeter from the stylus location.

3. The combination of claim 2 wherein said delay means is variable and includes means for generating a control signal inversely related to the styli groove velocity.

4. The combination of claims 1 or 2 wherein the support arm to unmodulated record surface is sensed with respect to the record surface land area adjacent the record groove location of said stylus.

5. A system for reading out modulated groove portions and unmodulated portions of a phonograph record, said system comprising:
   pickup means responsive to modulated portion of the record for generating a first signal component;
   sensing means for sensing the unmodulated portions of the record in the vicinity of the modulated portions read by the pickup means for generating a second signal component; and
   delay means for delaying one of the first and second signal components relative to the other so that the two signal components coincide substantially in time.

6. The system of claim 5, wherein the pickup means and the sensing means are spaced apart and the time delay introduced by the delay means compensates for the time difference between the generation of the two signal components caused by the spatial separation between the pickup and sensing means.

7. The system of claim 5, wherein said delay means is variable, said system further including means for generating a control signal inversely related to the speed at which the record is read by the pickup and sensing means for controlling the time delay introduced by the delay means.

8. The system of claim 5, further comprising means responsive to the undelayed signal component and the delayed signal component for substantially cancelling one component from the other.

9. The system of claim 8, further comprising a housing for holding the pickup means and the sensing means wherein said cancelling means is located external to said housing.

10. The system of claim 5, further comprising a housing for holding the pickup means and the sensing means wherein said first and second signal components are provided externally to said housing for further processing.

11. The system of claim 5, wherein the pickup means comprises a first stylus and the sensing means comprises a second stylus.

12. The system of claim 11, wherein the second stylus engages the record greater than a distance in the order of 1 mm from said first stylus.

13. The system of claim 11, wherein the tracking force of said second stylus is a small fractional part of that of the first stylus.

14. The system of claim 11, wherein said second stylus is arranged to read the record in advance of said first stylus.

15. The system of claim 11, wherein said second stylus is offset from said frist stylus to reduce the sensing of pre-echo.

16. The system of claim 11, wherein said delay means is variable, said system further including means for generating a control signal inversely related to the styli groove velocity for controlling the time delay introduced by the delay means.

17. A phonograph disc playback apparatus comprising:
   a turntable, adapted to support a disc thereon;

pickup means responsive to modulated portions of the disc for generating a first signal component;

sensor means for sensing the vertical deviation of the disc on the turntable in the vicinity of the pickup means to provide a second signal component;

delay means for delaying one of the first and second signal components relative to the other so that the two signal components substantially coincide in time; and an actuator responsive to a signal originating from the sensor means for moving the portion of the disc at the pickup means to reduce vertical deviation of the disk at the pickup means.

18. The apparatus of claim 17 wherein the sensor means senses the disc greater than a distance in the order of 1 mm. from the pickup means and wherein the time delay introduced by the delay means compensates for the time difference between the gneration of the two signal components caused by the spatial separation between the pickup means and the sensor means.

19. The apparatus of claim 17 wherein said delay means is variable, said apparatus further including means for generating a control signal inversely related to the speed at which the disc is played back for controlling the time delay introduced by the delay means.

20. A phonograph disc playback system comprising:

a cartridge;

a stylus carried by the cartridge for providing an audio signal representing the groove modulation of a disc;

means carried by the cartridge for sensing vertical deviations of an unmodulated part of the disc in the vicinity of the stylus to provide a vertical deviation signal, said sensing means being substantially more compliant than the stylus; and means for delaying one of the audio and the vertical deviation signals relative to the other so that the two signals substantially coincide in time.

21. The system of claim 20 further comprising a compensating electrical coupling between said stylus and sensing means wherein the sensing means at least partially removes from the audio signal the effects of vertical deviations sensed by the sensing means.

22. The system of claim 20 wherein the unmodulated part of the disc sensed by the sensing means is at a distance greater than about 1 mm. from the stylus.

23. The system of claim 20 wherein said delay means is variable, said system further including means for generating a control signal inversely related to the speed at which the disc is played back for controlling the time delay introduced by the delay means.

24. A phonograph disc playback apparatus comprising:

a cartridge;

a first sensor for sensing vertical deviation of the cartridge to provide a first signal component;

a second sensor for sensing vertical deviation of the disc relative to the cartridge to provide a second signal component;

delay means for delaying one of the first and second signal components relative to the other so that the two signal components substantially coincide in time; and an actuator responsive to an error signal which is a function of the difference between the undelayed signal component and the delayed signal component, said actuator being adapted to move the cartridge in response to the error signal, said error signal being representative of the vertical deviation of the disc relative to a reference plane.

25. The apparatus of claim 24 wherein the second sensor senses the disc at greater than a distance in the order of 1 mm. from the first sensor and wherein the time delay introduced by the delay means compensates for the time difference between the generation of the two signal components caused by the spatial separation between the two sensors.

26. The apparatus of claim 24 wherein said delay means is variable, said apparatus further including means for generating a control signal inversely related to the speed at which the record is played back for controlling the time delay introduced by the delay means.

27. In a system for reproducing mechanical recordings having corresponding adjacent modulated and unmodulated portion, the system including a pickup means, said system comprising:

means including a movable member attached to a reference surface and independent of said pickup means for contacting an unmodulated portion of the record adjacent a corresponding modulated portion being read by the pickup means, means associated with said movable member for sensing the position of said movable member to provide vertical location information, and delay means for delaying said vertical location information, wherein said delay means in variable and includes means for sensing the lateral position of the pickup means with respect to the record to vary said delay.

28. The combination of claim 27 wherein said system is for reproducing phonograph recordings, said modulated portion are grooves, said unmodulated portions are the land adjacent grooves, and wherein said movable member contacts the land.

29. The combination of claim 28, wherein said pickup means includes a cartridge and stylus for tracking the record grooves, said member contacting the land adjacent the stylus.

30. The combination of claim 29 wherein said member contacts the land more than about 1 millimeter from the stylus location.

* * * * *

UNITED STATES PATENT AND TRADEMARK OFFICE
CERTIFICATE OF CORRECTION

PATENT NO. : 4,712,208

DATED : Dec. 8, 1987

INVENTOR(S) : Ray M. Dolby

It is certified that error appears in the above-identified patent and that said Letters Patent is hereby corrected as shown below:

```
Col. 22, line 10:   "portion" should be --portions--;
         line 59:   "frist" should be --first--;
Col. 23, line 18:   "gneration" should be --generation--;
Col. 24, line 30:   "portion," should be --portions,--;
         line 41:   "in" should be --is--; and
         line 47:   "portion" should be --portions--.
```

Signed and Sealed this

Third Day of May, 1988

Attest:

DONALD J. QUIGG

Attesting Officer

Commissioner of Patents and Trademarks